United States Patent
Phan

(10) Patent No.: US 12,456,245 B2
(45) Date of Patent: Oct. 28, 2025

(54) ENHANCED SYSTEM FOR GENERATION AND OPTIMIZATION OF FACIAL MODELS AND ANIMATION

(71) Applicant: Electronic Arts Inc., Redwood City, CA (US)

(72) Inventor: Hau Nghiep Phan, Montreal (CA)

(73) Assignee: Electronic Arts Inc., Redwood City, CA (US)

( * ) Notice: Subject to any disclaimer, the term of this patent is extended or adjusted under 35 U.S.C. 154(b) by 109 days.

(21) Appl. No.: 18/478,638

(22) Filed: Sep. 29, 2023

(65) Prior Publication Data

US 2025/0111573 A1      Apr. 3, 2025

(51) Int. Cl.
*G06T 13/80*      (2011.01)
*G06T 3/4053*     (2024.01)
*G06T 19/20*      (2011.01)

(52) U.S. Cl.
CPC ............ *G06T 13/80* (2013.01); *G06T 3/4053* (2013.01); *G06T 19/20* (2013.01); *G06T 2219/2024* (2013.01)

(58) Field of Classification Search
CPC ....... G06T 13/80; G06T 3/4053; G06T 19/20; G06T 2219/2024; G06T 13/40; G06T 2219/2021; G06T 15/04; G06T 17/00
See application file for complete search history.

(56) References Cited

U.S. PATENT DOCUMENTS

| | | | |
|---|---|---|---|
| 5,274,801 A | 12/1993 | Gordon | |
| 5,548,798 A | 8/1996 | King | |
| 5,982,389 A | 11/1999 | Guenter et al. | |
| 5,999,195 A | 12/1999 | Santangeli | |
| 6,064,808 A | 5/2000 | Kapur et al. | |
| 6,088,040 A | 7/2000 | Oda et al. | |
| 6,253,193 B1 | 6/2001 | Ginter et al. | |
| 6,556,196 B1 | 4/2003 | Blanz et al. | |
| 6,961,060 B1 | 11/2005 | Mochizuki et al. | |
| 7,006,090 B2 | 2/2006 | Mittring | |
| 7,403,202 B1 | 7/2008 | Nash | |
| 7,415,152 B2 | 8/2008 | Jiang et al. | |
| 7,944,449 B2 | 5/2011 | Petrovic et al. | |
| 8,100,770 B2 | 1/2012 | Yamazaki et al. | |

(Continued)

FOREIGN PATENT DOCUMENTS

| | | |
|---|---|---|
| CN | 102509272 A | 6/2012 |
| CN | 103546736 A | 1/2014 |

(Continued)

OTHER PUBLICATIONS

Gao et al. (NPL), 2022, "GET3D: A Generative Model of High Quality 3D Textured Shapes Learned from Images" (Year: 2022).*

(Continued)

*Primary Examiner* — Daniel F Hajnik
*Assistant Examiner* — Adeel Bashir
(74) *Attorney, Agent, or Firm* — Knobbe, Martens, Olson & Bear, LLP

(57) ABSTRACT

Systems and methods are provided for enhanced animation generation based on generative modeling. An example method includes training models based on faces and information associated with persons. The modeling system being trained to reconstruct expressions, textures, and models of persons.

20 Claims, 13 Drawing Sheets

(56) References Cited

U.S. PATENT DOCUMENTS

| | | |
|---|---|---|
| 8,142,282 B2 | 3/2012 | Canessa et al. |
| 8,154,544 B1 | 4/2012 | Cameron et al. |
| 8,207,971 B1 | 6/2012 | Koperwas et al. |
| 8,267,764 B1 | 9/2012 | Aoki et al. |
| 8,281,281 B1 | 10/2012 | Smyrl et al. |
| 8,395,626 B2 | 3/2013 | Millman |
| 8,398,476 B1 | 3/2013 | Sidhu et al. |
| 8,406,528 B1 | 3/2013 | Hatwich |
| 8,540,560 B2 | 9/2013 | Crowley et al. |
| 8,599,206 B2 | 12/2013 | Hodgins et al. |
| 8,624,904 B1 | 1/2014 | Koperwas et al. |
| 8,648,863 B1 | 2/2014 | Anderson et al. |
| 8,860,732 B2 | 10/2014 | Popovic et al. |
| 8,914,251 B2 | 12/2014 | Ohta |
| 9,067,097 B2 | 6/2015 | Lane et al. |
| 9,098,766 B2 | 8/2015 | Dariush et al. |
| 9,117,134 B1 | 8/2015 | Geiss et al. |
| 9,177,409 B2 | 11/2015 | Rennuit et al. |
| 9,208,613 B2 | 12/2015 | Mukai |
| 9,256,973 B2 | 2/2016 | Koperwas et al. |
| 9,317,954 B2 | 4/2016 | Li et al. |
| 9,483,860 B2 | 11/2016 | Hwang et al. |
| 9,616,329 B2 | 4/2017 | Szufnara et al. |
| 9,741,146 B1 | 8/2017 | Nishimura |
| 9,811,716 B2 | 11/2017 | Kim et al. |
| 9,826,898 B1 | 11/2017 | Jin et al. |
| 9,827,496 B1 | 11/2017 | Zinno |
| 9,858,700 B2 | 1/2018 | Rose et al. |
| 9,928,663 B2 | 3/2018 | Eisemann et al. |
| 9,947,123 B1 | 4/2018 | Green |
| 9,984,658 B2 | 5/2018 | Bonnier et al. |
| 9,987,749 B2 | 6/2018 | Nagendran et al. |
| 9,990,754 B1 | 6/2018 | Waterson et al. |
| 10,022,628 B1 | 7/2018 | Matsumiya et al. |
| 10,096,133 B1 | 10/2018 | Andreev |
| 10,118,097 B2 | 11/2018 | Stevens |
| 10,163,001 B2 | 12/2018 | Kim et al. |
| 10,198,845 B1 | 2/2019 | Bhat et al. |
| 10,297,066 B2 | 5/2019 | Brewster |
| 10,314,477 B1 | 6/2019 | Goodsitt et al. |
| 10,388,053 B1 | 8/2019 | Carter, Jr. et al. |
| 10,403,018 B1 | 9/2019 | Worsham |
| 10,535,174 B1 | 1/2020 | Rigiroli et al. |
| 10,565,731 B1 | 2/2020 | Reddy et al. |
| 10,726,611 B1 | 7/2020 | Court |
| 10,733,765 B2 | 8/2020 | Andreev |
| 10,755,466 B2 | 8/2020 | Chamdani et al. |
| 10,783,690 B2 | 9/2020 | Sagar et al. |
| 10,792,566 B1 | 10/2020 | Schmid |
| 10,810,780 B2 | 10/2020 | Hutchinson et al. |
| 10,818,065 B1 | 10/2020 | Saito et al. |
| 10,856,733 B2 | 12/2020 | Anderson et al. |
| 10,860,838 B1 | 12/2020 | Elahie et al. |
| 10,878,540 B1 | 12/2020 | Stevens |
| 10,902,618 B2 | 1/2021 | Payne et al. |
| 11,017,560 B1 | 5/2021 | Gafni et al. |
| 11,062,494 B2 | 7/2021 | Orvalho et al. |
| 11,113,860 B2 | 9/2021 | Rigiroli et al. |
| 11,217,003 B2 | 1/2022 | Akhoundi et al. |
| 11,232,621 B2 | 1/2022 | Akhoundi et al. |
| 11,295,479 B2 | 4/2022 | Andreev |
| 11,504,625 B2 | 11/2022 | Stevens |
| 11,648,480 B2 | 5/2023 | Akhoundi |
| 11,798,176 B2 | 10/2023 | Payne et al. |
| 11,836,843 B2 | 12/2023 | Akhoundi et al. |
| 2002/0013172 A1 | 1/2002 | Kaku et al. |
| 2002/0054054 A1 | 5/2002 | Sanbe |
| 2002/0089504 A1 | 7/2002 | Merrick et al. |
| 2002/0140696 A1 | 10/2002 | Futamura et al. |
| 2002/0180739 A1 | 12/2002 | Reynolds et al. |
| 2003/0038818 A1 | 2/2003 | Tidwell |
| 2004/0027352 A1 | 2/2004 | Minakuchi |
| 2004/0104912 A1 | 6/2004 | Yamamoto et al. |
| 2004/0138959 A1 | 7/2004 | Hlavac et al. |
| 2004/0227760 A1 | 11/2004 | Anderson et al. |
| 2004/0227761 A1 | 11/2004 | Anderson et al. |
| 2005/0237550 A1 | 10/2005 | Hu |
| 2006/0036514 A1 | 2/2006 | Steelberg et al. |
| 2006/0061574 A1 | 3/2006 | Ng-Thow-Hing et al. |
| 2006/0149516 A1 | 7/2006 | Bond et al. |
| 2006/0217945 A1 | 9/2006 | Leprevost |
| 2006/0250526 A1 | 11/2006 | Wang et al. |
| 2006/0262113 A1 | 11/2006 | Leprevost |
| 2006/0262114 A1 | 11/2006 | Leprevost |
| 2007/0085851 A1 | 4/2007 | Muller et al. |
| 2007/0097125 A1 | 5/2007 | Xie et al. |
| 2008/0049015 A1 | 2/2008 | Elmieh et al. |
| 2008/0111831 A1 | 5/2008 | Son et al. |
| 2008/0152218 A1 | 6/2008 | Okada |
| 2008/0268961 A1 | 10/2008 | Brook |
| 2008/0316202 A1 | 12/2008 | Zhou et al. |
| 2009/0066700 A1 | 3/2009 | Harding et al. |
| 2009/0315839 A1 | 12/2009 | Wilson et al. |
| 2010/0134501 A1 | 6/2010 | Lowe et al. |
| 2010/0251185 A1 | 9/2010 | Pattenden |
| 2010/0267465 A1 | 10/2010 | Ceminchuk |
| 2010/0277497 A1 | 11/2010 | Dong et al. |
| 2010/0302257 A1 | 12/2010 | Perez et al. |
| 2011/0012903 A1 | 1/2011 | Girard |
| 2011/0074807 A1 | 3/2011 | Inada et al. |
| 2011/0086702 A1 | 4/2011 | Borst et al. |
| 2011/0119332 A1 | 5/2011 | Marshall et al. |
| 2011/0128292 A1 | 6/2011 | Ghyme et al. |
| 2011/0164831 A1 | 7/2011 | Van Reeth et al. |
| 2011/0187731 A1 | 8/2011 | Tsuchida |
| 2011/0221755 A1 | 9/2011 | Geisner et al. |
| 2011/0269540 A1 | 11/2011 | Gillo et al. |
| 2011/0292055 A1 | 12/2011 | Hodgins et al. |
| 2011/0319164 A1 | 12/2011 | Matsushita et al. |
| 2012/0028706 A1 | 2/2012 | Raitt et al. |
| 2012/0083330 A1 | 4/2012 | Ocko |
| 2012/0115580 A1 | 5/2012 | Hornik et al. |
| 2012/0220376 A1 | 8/2012 | Takayama et al. |
| 2012/0244941 A1 | 9/2012 | Ostergren et al. |
| 2012/0303343 A1 | 11/2012 | Sugiyama et al. |
| 2012/0310610 A1 | 12/2012 | Ito et al. |
| 2012/0313931 A1 | 12/2012 | Matsuike et al. |
| 2013/0050464 A1 | 2/2013 | Kang |
| 2013/0063555 A1 | 3/2013 | Matsumoto et al. |
| 2013/0120439 A1 | 5/2013 | Harris et al. |
| 2013/0121618 A1 | 5/2013 | Yadav |
| 2013/0222433 A1 | 8/2013 | Chapman et al. |
| 2013/0235045 A1 | 9/2013 | Corazza et al. |
| 2013/0263027 A1 | 10/2013 | Petschnigg et al. |
| 2013/0271458 A1 | 10/2013 | Andriluka et al. |
| 2013/0293538 A1 | 11/2013 | Mukai |
| 2013/0311885 A1 | 11/2013 | Wang et al. |
| 2014/0002463 A1 | 1/2014 | Kautzman et al. |
| 2014/0035933 A1 | 2/2014 | Saotome |
| 2014/0066196 A1 | 3/2014 | Crenshaw |
| 2014/0198106 A1 | 7/2014 | Sumner et al. |
| 2014/0198107 A1 | 7/2014 | Thomaszewski et al. |
| 2014/0267312 A1 | 9/2014 | Powell |
| 2014/0327694 A1 | 11/2014 | Cao et al. |
| 2014/0340644 A1 | 11/2014 | Haine et al. |
| 2015/0113370 A1 | 4/2015 | Flider |
| 2015/0126277 A1 | 5/2015 | Aoyagi |
| 2015/0187113 A1 | 7/2015 | Rubin et al. |
| 2015/0235351 A1 | 8/2015 | Mirbach et al. |
| 2015/0243326 A1 | 8/2015 | Pacurariu et al. |
| 2015/0381925 A1 | 12/2015 | Varanasi et al. |
| 2016/0026926 A1 | 1/2016 | Yeung et al. |
| 2016/0042548 A1 | 2/2016 | Du et al. |
| 2016/0071470 A1 | 3/2016 | Kim et al. |
| 2016/0078662 A1 | 3/2016 | Herman et al. |
| 2016/0217723 A1 | 7/2016 | Kim et al. |
| 2016/0220903 A1 | 8/2016 | Miller et al. |
| 2016/0307369 A1 | 10/2016 | Freedman et al. |
| 2016/0314617 A1 | 10/2016 | Forster et al. |
| 2016/0353987 A1 | 12/2016 | Carrafa et al. |
| 2016/0354693 A1 | 12/2016 | Yan et al. |
| 2017/0090577 A1 | 3/2017 | Rihn |
| 2017/0132827 A1 | 5/2017 | Tena et al. |
| 2017/0161909 A1 | 6/2017 | Hamanaka et al. |

(56) References Cited

U.S. PATENT DOCUMENTS

| | | |
|---|---|---|
| 2017/0301310 A1 | 10/2017 | Bonnier et al. |
| 2017/0301316 A1 | 10/2017 | Farell |
| 2018/0024635 A1 | 1/2018 | Kaifosh et al. |
| 2018/0043257 A1 | 2/2018 | Stevens |
| 2018/0068178 A1 | 3/2018 | Theobalt et al. |
| 2018/0122125 A1 | 5/2018 | Brewster |
| 2018/0165864 A1 | 6/2018 | Jin et al. |
| 2018/0211102 A1 | 7/2018 | Alsmadi |
| 2018/0239526 A1 | 8/2018 | Varanasi et al. |
| 2018/0338136 A1 | 11/2018 | Akaike et al. |
| 2019/0122152 A1 | 4/2019 | McCoy et al. |
| 2019/0139264 A1 | 5/2019 | Andreev |
| 2019/0172229 A1 | 6/2019 | Chan et al. |
| 2019/0206181 A1 | 7/2019 | Sugai |
| 2019/0325633 A1 | 10/2019 | Miller, IV et al. |
| 2019/0392587 A1 | 12/2019 | Nowozin et al. |
| 2020/0020138 A1 | 1/2020 | Smith et al. |
| 2020/0020166 A1 | 1/2020 | Menard et al. |
| 2020/0051304 A1 | 2/2020 | Choi et al. |
| 2020/0078683 A1 | 3/2020 | Anabuki et al. |
| 2020/0151963 A1 | 5/2020 | Lee et al. |
| 2020/0226811 A1 | 7/2020 | Kim et al. |
| 2020/0258280 A1 | 8/2020 | Park et al. |
| 2020/0294299 A1 | 9/2020 | Rigiroli et al. |
| 2020/0302668 A1 | 9/2020 | Guo et al. |
| 2020/0306640 A1 | 10/2020 | Kolen et al. |
| 2020/0310541 A1 | 10/2020 | Reisman et al. |
| 2020/0364303 A1 | 11/2020 | Liu et al. |
| 2021/0019916 A1 | 1/2021 | Andreev |
| 2021/0042526 A1 | 2/2021 | Ikeda et al. |
| 2021/0074004 A1 | 3/2021 | Wang et al. |
| 2021/0125036 A1 | 4/2021 | Tremblay et al. |
| 2021/0192357 A1 | 6/2021 | Sinha et al. |
| 2021/0217184 A1 | 7/2021 | Payne et al. |
| 2021/0220739 A1 | 7/2021 | Zinno et al. |
| 2021/0252403 A1 | 8/2021 | Stevens |
| 2021/0279956 A1 | 9/2021 | Chandran et al. |
| 2021/0308580 A1 | 10/2021 | Akhoundi et al. |
| 2021/0312688 A1 | 10/2021 | Akhoundi et al. |
| 2021/0312689 A1 | 10/2021 | Akhoundi et al. |
| 2021/0316221 A1 | 10/2021 | Waszak |
| 2021/0335039 A1 | 10/2021 | Jones et al. |
| 2021/0390789 A1 | 12/2021 | Liu et al. |
| 2022/0020195 A1 | 1/2022 | Kuta et al. |
| 2022/0051003 A1 | 2/2022 | Niinuma et al. |
| 2022/0138455 A1 | 5/2022 | Nagano et al. |
| 2022/0198733 A1 | 6/2022 | Akhoundi et al. |
| 2022/0222892 A1 | 7/2022 | Luo et al. |
| 2022/0383578 A1 | 12/2022 | Kennewick, Sr. et al. |
| 2022/0398795 A1 | 12/2022 | Phan |
| 2022/0398796 A1 | 12/2022 | Phan |
| 2022/0398797 A1 | 12/2022 | Phan |
| 2023/0146141 A1 | 5/2023 | Stevens |
| 2023/0186541 A1 | 6/2023 | Starke et al. |

FOREIGN PATENT DOCUMENTS

| | | |
|---|---|---|
| CN | 105405380 A | 3/2016 |
| CN | 105825778 A | 8/2016 |
| CN | 107427723 A | 12/2017 |
| CN | 107694092 A | 2/2018 |
| CN | 109672780 A | 4/2019 |
| JP | 2018-520820 A | 8/2018 |
| JP | 2019-162400 A | 9/2019 |

OTHER PUBLICATIONS

Feng et al. (NPL), 2021, "Learning an Animatable Detailed 3D Face Model from In-The-Wild Images" (Year: 2021).*

Chan et al. (NPL), 2022, "Efficient Geometry-aware 3D Generative Adversarial Networks" (Year: 2022).*

Munkberg et al. (NPL), Apr. 2023, "Extracting Triangular 3D Models, Materials, and Lighting From Images" (Year: 2023).*

Ali, Kamran, and Charles E. Hughes. "Facial expression recognition using disentangled adversarial learning." arXiv preprint arXiv:1909.13135 (2019). (Year: 2019).

Anagnostopoulos et al., "Intelligent modification for the daltonization process", International Conference on Computer Vision Published in 2007 by Applied Computer Science Group of digitized paintings.

Andersson, S., Goransson, J.: Virtual Texturing with WebGL. Master's thesis, Chalmers University of Technology, Gothenburg, Sweden (2012).

Avenali, Adam, "Color Vision Deficiency and Video Games", The Savannah College of Art and Design, Mar. 2013.

Badlani et al., "A Novel Technique for Modification of Images for Deuteranopic Viewers", May 2016.

Belytschko et al., "Assumed strain stabilization of the eight node hexahedral element," Computer Methods in Applied Mechanics and Engineering, vol. 105(2), pp. 225-260 (1993), 36 pages.

Belytschko et al., Nonlinear Finite Elements for Continua and Structures, Second Edition, Wiley (Jan. 2014), 727 pages (uploaded in 3 parts).

Blanz V, Vetter T. A morphable model for the synthesis of 3D faces. In Proceedings of the 26th annual conference on Computer graphics and interactive techniques Jul. 1, 1999 (pp. 187-194). ACM Press/ Addison-Wesley Publishing Co.

Blanz et al., "Reanimating Faces in Images and Video" Sep. 2003, vol. 22, No. 3, pp. 641-650, 10 pages.

Chao et al., "A Simple Geometric Model for Elastic Deformations", 2010, 6 pgs.

Cook et al., Concepts and Applications of Finite Element Analysis, 1989, Sections 6-11 through 6-14.

Cournoyer et al., "Massive Crowd on Assassin's Creed Unity: AI Recycling," Mar. 2, 2015, 55 pages.

Dick et al., "A Hexahedral Multigrid Approach for Simulating Cuts in Deformable Objects", IEEE Transactions on Visualization and Computer Graphics, vol. X, No. X, Jul. 2010, 16 pgs.

Diziol et al., "Robust Real-Time Deformation of Incompressible Surface Meshes", to appear in Proceedings of the 2011 ACM SIGGRAPH/Eurographics Symposium on Computer Animation (2011), 10 pgs.

Dudash, Bryan. "Skinned instancing." NVidia white paper(2007).

Fikkan, Eirik. Incremental loading of terrain textures. MS thesis. Institutt for datateknikk og informasjonsvitenskap, 2013.

Geijtenbeek, T. et al., "Interactive Character Animation using Simulated Physics", Games and Virtual Worlds, Utrecht University, The Netherlands, The Eurographics Association 2011, 23 pgs.

Georgii et al., "Corotated Finite Elements Made Fast and Stable", Workshop in Virtual Reality Interaction and Physical Simulation VRIPHYS (2008), 9 pgs.

Habibie et al., "A Recurrent Variational Autoencoder for Human Motion Synthesis", 2017, in 12 pages.

Halder et al., "Image Color Transformation for Deuteranopia Patients using Daltonization", IOSR Journal of VLSI and Signal Processing (IOSR-JVSP) vol. 5, Issue 5, Ver. I (Sep.-Oct. 2015), pp. 15-20.

Han et al., "On-line Real-time Physics-based Predictive Motion Control with Balance Recovery," Eurographics, vol. 33(2), 2014, 10 pages.

Hernandez, Benjamin, et al. "Simulating and visualizing real-time crowds on GPU clusters." Computación y Sistemas 18.4 (2014): 651-664.

Hu G, Chan CH, Yan F, Christmas W, Kittler J. Robust face recognition by an albedo based 3D morphable model. In Biometrics (IJCB), 2014 IEEE International Joint Conference on Sep. 29, 2014 (pp. 1-8). IEEE.

Hu Gousheng, Face Analysis using 3D Morphable Models, Ph.D. Thesis, University of Surrey, Apr. 2015, pp. 1-112.

Irving et al., "Invertible Finite Elements for Robust Simulation of Large Deformation", Eurographics/ACM SIGGRAPH Symposium on Computer Animation (2004), 11 pgs.

Kaufmann et al., "Flexible Simulation of Deformable Models Using Discontinuous Galerkin FEM", Oct. 1, 2008, 20 pgs.

Kavan et al., "Skinning with Dual Quaternions", 2007, 8 pgs.

(56) References Cited

OTHER PUBLICATIONS

Kim et al., "Long Range Attachments—A Method to Simulate Inextensible Clothing in Computer Games", Eurographics/ACM SIGGRAPH Symposium on Computer Animation (2012), 6 pgs.
Klein, Joseph. Rendering Textures Up Close in a 3D Environment Using Adaptive Micro-Texturing. Diss. Mills College, 2012.
Komura et al., "Animating reactive motion using momentum-based inverse kinematics," Computer Animation and Virtual Worlds, vol. 16, pp. 213-223, 2005, 11 pages.
Lee, Y. et al., "Motion Fields for Interactive Character Animation", University of Washington, Bungie, Adobe Systems, 8 pgs, obtained Mar. 20, 2015.
Levine, S. et al., "Continuous Character Control with Low-Dimensional Embeddings", Stanford University, University of Washington, 10 pgs, obtained Mar. 20, 2015.
Macklin et al., "Position Based Fluids", to appear in ACM TOG 32(4), 2013, 5 pgs.
Mcadams et al., "Efficient Elasticity for Character Skinning with Contact and Collisions", 2011, 11 pgs.
McDonnell, Rachel, et al. "Clone attack! perception of crowd variety." ACM Transactions on Graphics (TOG). vol. 27. No. 3. ACM, 2008.
Muller et al., "Meshless Deformations Based on Shape Matching", SIGGRAPH 2005, 29 pgs.
Muller et al., "Adding Physics to Animated Characters with Oriented Particles", Workshop on Virtual Reality Interaction and Physical Simulation VRIPHYS (2011), 10 pgs.
Muller et al., "Real Time Dynamic Fracture with Columetric Approximate Convex Decompositions", ACM Transactions of Graphics, Jul. 2013, 11 pgs.
Muller et al., "Position Based Dymanics", VRIPHYS 2006, Oct. 21, 2014, Computer Graphics, Korea University, 23 pgs.
Musse, Soraia Raupp, and Daniel Thalmann. "Hierarchical model for real time simulation of virtual human crowds." IEEE Transactions on Visualization and Computer Graphics 7.2 (2001): 152-164.
Nguyen et al., "Adaptive Dynamics With Hybrid Response," 2012, 4 pages.
O'Brien et al., "Graphical Modeling and Animation of Brittle Fracture", GVU Center and College of Computing, Georgia Institute of Technology, Reprinted from the Proceedings of ACM SIGGRAPH 99, 10 pgs, dated 1999.
Orin et al., "Centroidal dynamics of a humanoid robot," Auton Robot, vol. 35, pp. 161-176, 2013, 18 pages.
Parker et al., "Real-Time Deformation and Fracture in a Game Environment", Eurographics/ACM SIGGRAPH Symposium on Computer Animation (2009), 12 pgs.
Pelechano, Nuria, Jan M. Allbeck, and Norman I. Badler. "Controlling individual agents in high-density crowd simulation." Proceedings of the 2007 ACM SIGGRAPH/Eurographics symposium on Computer animation. Eurographics Association, 2007. APA.
R. P. Prager, L. Troost, S. Bruggenjurgen, D. Melhart, G. Yannakakis and M. Preuss, "An Experiment on Game Facet Combination\," 2019, 2019 IEEE Conference on Games (CoG), London, UK, pp. 1-8, https://ieeexplore.ieee.org/stamp/stamp.jsp?tp=&arnumber=8848073 (Year: 2019).
Qiao, Fengchun, et al. "Geometry-contrastive gan for facial expression transfer." arXiv preprint arXiv: 1802.01822 (2018). (Year: 2018).
Rivers et al., "FastLSM: Fast Lattice Shape Matching for Robust Real-Time Deformation", ACM Transactions on Graphics, vol. 26, No. 3, Article 82, Publication date: Jul. 2007, 6 pgs.
Ruiz, Sergio, et al. "Reducing memory requirements for diverse animated crowds." Proceedings of Motion on Games. ACM, 2013.
Rungjiratananon et al., "Elastic Rod Simulation by Chain Shape Matching withTwisting Effect" SIGGRAPH Asia 2010, Seoul, South Korea, Dec. 15-18, 2010, ISBN 978-1-4503-0439-9/10/0012, 2 pgs.
Seo et al., "Compression and Direct Manipulation of Complex Blendshape Models", In ACM Transactions on Graphics (TOG) Dec. 12, 2011 (vol. 30, No. 6, p. 164). ACM. (Year: 2011), 10 pgs.
Sifakis, Eftychios D., "FEM Simulations of 3D Deformable Solids: A Practioner's Guide to Theory, Discretization and Model Reduction. Part One: The Classical FEM Method and Discretization Methodology", SIGGRAPH 2012 Course, Version 1.0 [Jul. 10, 2012], 50 pgs.
Stomakhin et al., "Energetically Consistent Invertible Elasticity", Eurographics/ACM SIGRAPH Symposium on Computer Animation (2012), 9 pgs.
Thalmann, Daniel, and Soraia Raupp Musse. "Crowd rendering." Crowd Simulation. Springer London, 2013. 195-227.
Thalmann, Daniel, and Soraia Raupp Musse. "Modeling of Populations." Crowd Simulation. Springer London, 2013. 31-80.
Treuille, A. et al., "Near-optimal Character Animation with Continuous Control", University of Washington, 2007, 7 pgs.
Ulicny, Branislav, and Daniel Thalmann. "Crowd simulation for interactive virtual environments and VR training systems." Computer Animation and Simulation 2001 (2001 ): 163-170.
Vaillant et al., "Implicit Skinning: Real-Time Skin Deformation with Contact Modeling", (2013) ACM Transactions on Graphics, vol. 32 (n° 4). pp. 1-11. ISSN 0730-0301, 12 pgs.
Vigueras, Guillermo, et al. "A distributed visualization system for crowd simulations." Integrated Computer-Aided Engineering 18.4 (2011 ): 349-363.
Wu et al., "Goal-Directed Stepping with Momentum Control," Eurographics/ ACM SIGGRAPH Symposium on Computer Animation, 2010, 6 pages.
Zhang, Jiangning, et al. "Freenet: Multi-identity face reenactment." Proceedings of the IEEE/CVF conference on computer vision and pattern recognition. 2020. (Year: 2020).

\* cited by examiner

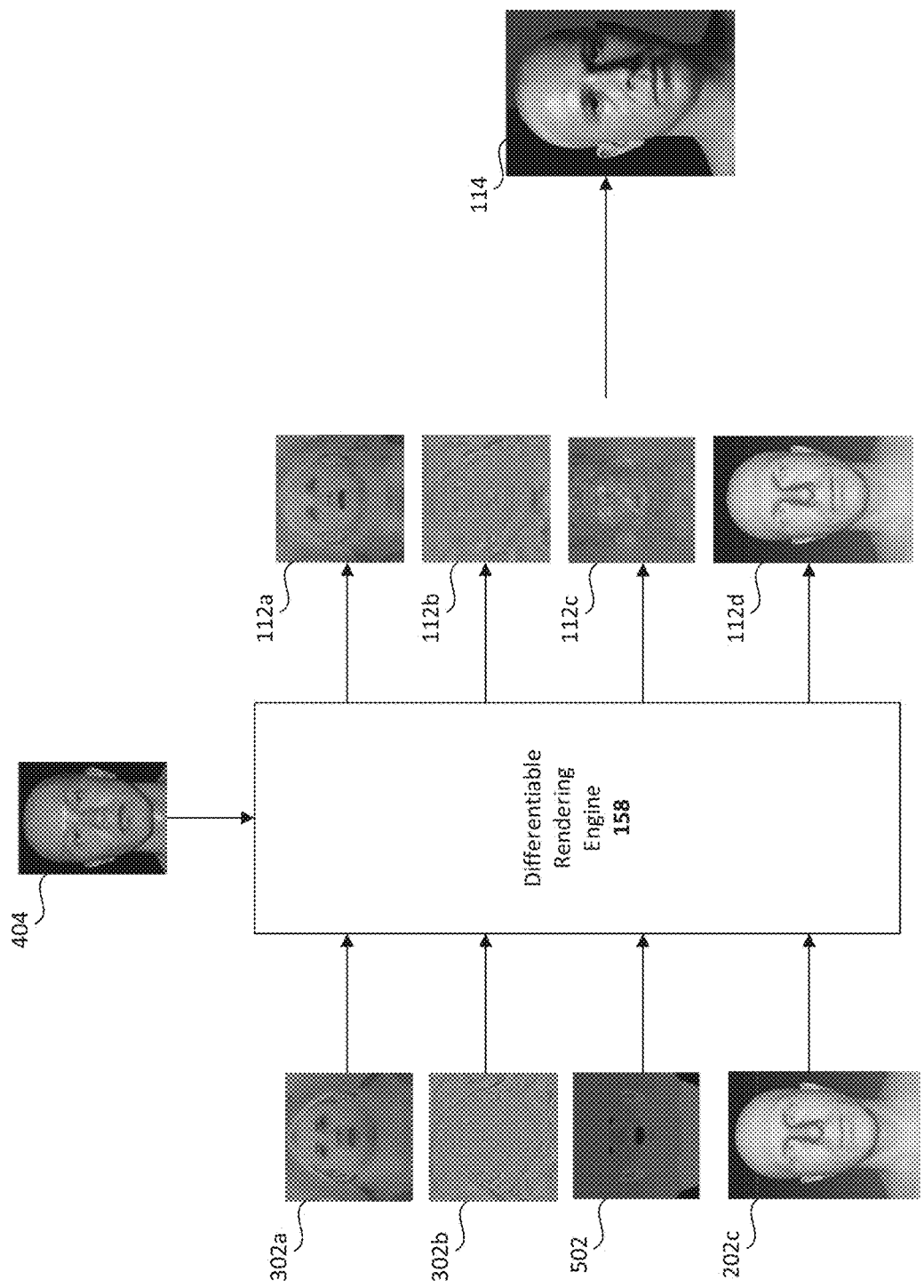

ENHANCED SYSTEM FOR GENERATION AND OPTIMIZATION OF FACIAL MODELS AND ANIMATION

TECHNICAL FIELD

The present disclosure relates to systems and techniques for generation and optimization of facial expressions, textures, and meshes for virtual character models. More specifically, this disclosure relates to machine learning techniques for character model generation of human faces.

BACKGROUND

Electronic games are increasingly becoming more realistic due to an increase in available processing resources. The games can include rich, lifelike, characters that are created to follow complex scripts, and are placed in video games via computationally expensive animation processes. This increase in realism may allow for more realistic gameplay experiences. For example, elements that form an in-game world, such as characters, may be more realistically presented. In this example, the elements may be increasingly rendered at higher resolutions, with more detailed textures, with more detailed underlying meshes, and so on. While this added realism may be beneficial to an end-user of an electronic game, it may place a substantial burden on electronic game designers. As an example, electronic game designers may be required to create very rich, and detailed, models of character faces and expressions. As another example, electronic game designers may be required to create fluid, lifelike, expressions for each character within a game.

A character may be animated to emote, and in so doing the character's face may express disparate feelings while providing dialogue. For example, a character may express feelings of happiness, apprehension, fear, and so on. Generally, video game modelers are required to manipulate a 3D model of a character's face to arrive at each emotion. As an example, a video game modeler may modify the character's face to appear happy. This modification may stem from the video game modeler's utilization of software to create a 3D model of the character's face, and then adjust the 3D model until it conforms to the emotion required. However, each character's range of facial expressions are required to be modeled separately. That is, a video game modeler will have to uniquely adjust a 3D model of each character's face until the face arrives at each of defined facial expression. The process can result in a large amount of work which is not transferable between characters.

Additionally, once each character's face is modeled, the modeled expressions are not easily adjustable to indicate variations on the expression. For example, a modeler can create a happy face for a character, and one or more variations that express slightly different emotions that are related to being happy (e.g., a bemused look). When the character is being animated, a video game animator may only be able to select from the happy face, or pre-configured variations, when animating a scene. Thus, the character's facial expressions can lack granularity seen in real humans as the same faces are being repeated.

SUMMARY OF CERTAIN EMBODIMENTS

Particular embodiments of the subject matter described in this specification can be implemented so as to realize one or more of the following advantages. Utilizing the techniques described herein, realistic facial models (including texture maps and meshes) and animations may be rapidly generated and optimized for a virtual character for use in electronic games. As will be described, machine learning techniques may be employed to learn representations of distinct human faces. For example, a facial model may be defined, at least in part, based on positions of a multitude of features on the human face. Example features may include eyes, a nose, a mouth, ears, and so on. As may be appreciated, these features may be adjusted on a person to generate various expressions or perform various actions, such as speak, blink, and the like. The features of faces may be analyzed by the machine learning techniques. Advantageously, the machine learning techniques may utilize generative models. The generative models may allow for generation of realistic facial models and expressions based on learned faces of humans.

At present, techniques to generate facial animations and models for character models may rely upon designers manually generating and adjusting the character models to define different types of expressions. For example, to define smiling, a designer would need to define the positions of the features of the face of the model. In this example, the designer may upturn the position the corners of mouth, and so on. While this may allow for a smile to be generated, it may also involve a substantial burden on the designer.

In some aspects, the techniques described herein relate to a computer-implemented method including: accessing a first set of machine learning models trained to generate, via a latent variable space, a three-dimensional (3D) mesh and a plurality of two-dimensional (2D) texture maps corresponding to the three-dimensional mesh; obtaining a first set of input information configured to generate a first facial model having a first identity; generating, by the first set of machine learning models, the first facial model from the first set of input information, wherein the first facial model includes a plurality of 2D texture maps and a 3D facial mesh of a first face; accessing a second machine learning model trained to generate photorealistic 2D images based on an input image; and generating, using the second machine learning model, at least one target photorealistic 2D image based on the first facial model; accessing a differentiable rendering engine, wherein the differentiable rendering engine is configured to modify facial models based on target 2D images; modifying, by the differentiable rendering engine, the first facial model based on the at least one target photorealistic 2D image; and outputting, by the differentiable rendering engine, an enhanced first facial model, wherein the enhanced first facial model includes a modified version of the plurality of 2D texture maps and a modified version of the 3D facial mesh.

In some aspects, the techniques described herein relate to a computer-implemented method, further including, prior to generating the at least one target photorealistic 2D image: accessing a diffusion-based machine learning model configured to increase resolution of a 2D image; generating, using the diffusion-based machine learning model, an upscaled 2D texture map for each of the plurality of 2D texture maps, wherein a resolution of each of the plurality of 2D texture maps is increased to a higher resolution.

In some aspects, the techniques described herein relate to a computer-implemented method, wherein modifying the first facial model includes: generating a plurality of input images from character facial model based on the plurality of 2D texture maps and 3D facial mesh of the first face from a plurality of different angles; generating, by the second machine learning model, a plurality of target photorealistic 2D images from the plurality of input images; and extracting, by the differentiable rendering engine, a plurality of 3D surface properties from the plurality of photorealistic images; adjusting the plurality of 2D texture maps and 3D facial meshes of the first face based on the plurality of 3D surface properties.

In some aspects, the techniques described herein relate to a computer-implemented method, wherein the plurality of 2D texture maps include a diffuse texture map and a normal texture map generated by the first set of machine learning models, and a roughness texture map generated by an independent process.

In some aspects, the techniques described herein relate to a computer-implemented method, further includes iteratively adjusting the 2D texture maps and the 3D facial meshes until a difference threshold is satisfied.

In some aspects, the techniques described herein relate to a computer-implemented method, further including: determining a difference between facial features of at least one 2D render of the adjusted facial model and at least one target photorealistic image; and determining whether the difference satisfies the difference threshold.

In some aspects, the techniques described herein relate to a computer-implemented method, wherein the first facial model is generating having a first expression, and the first set of machine learning models is configured to generate the first facial model for a plurality of expressions.

In some aspects, the techniques described herein relate to a computer-implemented method, wherein the plurality of 2D texture maps include at least a diffuse map and a normal map for each expression of the plurality of expressions.

In some aspects, the techniques described herein relate to a computer-implemented method, wherein the first set of machine learning models include: an identity machine learning model trained to generate identity information; an expression machine learning model trained to generate expression information; a texture map machine learning model trained to generate 2D texture maps; and a mesh machine learning model trained to generate 3D meshes; wherein generating the first facial model includes: generating, by the identity machine learning model, identity information representative of an invariant identity of the first face; generating, by the expression machine learning model, expression information from the first set of input information, wherein the expression information includes a defined set of expressions of the first face; generating, by the texture map machine learning model, the 2D texture maps of the first face in the plurality of expressions from the identity information and the expression information; and generating, by the mesh machine learning model, the 3D facial meshes of the first face in the plurality of expressions from the identity information and the expression information.

In some aspects, the techniques described herein relate to a system including one or more computers and non-transitory computer storage media storing instructions that when executed by the one or more computers, cause the one or more computers to perform operations including: accessing a first set of machine learning models trained to generate, via a latent variable space, a three-dimensional (3D) mesh and a plurality of two-dimensional (2D) texture maps corresponding to the three-dimensional mesh; obtaining a first set of input information configured to generate a first facial model having a first identity; generating, by the first set of machine learning models, the first facial model from the first set of input information, wherein the first facial model includes a plurality of 2D texture maps and a 3D facial mesh of a first face; accessing a second machine learning model trained to generate photorealistic 2D images based on an input image; and generating, using the second machine learning model, at least one target photorealistic 2D image based on the first facial model; accessing a differentiable rendering engine, wherein the differentiable rendering engine is configured to modify facial models based on target 2D images; modifying, by the differentiable rendering engine, the first facial model based on the at least one target photorealistic 2D image; and outputting, by the differentiable rendering engine, an enhanced first facial model, wherein the enhanced first facial model includes a modified version of the plurality of 2D texture maps and a modified version of the 3D facial mesh.

In some aspects, the techniques described herein relate to a system, wherein the instructions further configure the one or more computers to perform operations including, prior to generating the at least one target photorealistic 2D image: accessing a diffusion-based machine learning model configured to increase resolution of a 2D image; generating, using the diffusion-based machine learning model, an upscaled 2D texture map for each of the plurality of 2D texture maps, wherein a resolution of each of the plurality of 2D texture maps is increased to a higher resolution.

In some aspects, the techniques described herein relate to a system, wherein the instructions further configure the one or more computers to perform operations when modifying the first facial model including: generating a plurality of input images from character facial model based on the plurality of 2D texture maps and 3D facial mesh of the first face from a plurality of different angles; generating, by the second machine learning model, a plurality of target photorealistic 2D images from the plurality of input images; and extracting, by the differentiable rendering engine, a plurality of 3D surface properties from the plurality of photorealistic images; adjusting the plurality of 2D texture maps and 3D facial meshes of the first face based on the plurality of 3D surface properties.

In some aspects, the techniques described herein relate to a system, wherein the plurality of 2D texture maps include a diffuse texture map and a normal texture map generated by the first set of machine learning models, and a roughness texture map generated by an independent process.

In some aspects, the techniques described herein relate to a system, wherein the instructions further configure the one or more computers to perform operations including iteratively adjusting the 2D texture maps and the 3D facial meshes until a difference threshold is satisfied.

In some aspects, the techniques described herein relate to a system, wherein the instructions further configure the one or more computers to perform operations including: determining a difference between facial features of at least one 2D render of the adjusted facial model and at least one target photorealistic image; and determining whether the difference satisfies the difference threshold.

In some aspects, the techniques described herein relate to a system, wherein the first facial model is generating having a first expression, and the first set of machine learning models is configured to generate the first facial model for a plurality of expressions.

In some aspects, the techniques described herein relate to a system, wherein the plurality of 2D texture maps include at least a diffuse map and a normal map for each expression of the plurality of expressions.

In some aspects, the techniques described herein relate to a system, wherein the first set of machine learning models include: an identity machine learning model trained to generate identity information; an expression machine learning model trained to generate expression information; a texture map machine learning model trained to generate 2D texture maps; and a mesh machine learning model trained to generate 3D meshes; wherein generating the first facial model includes: generating, by the identity machine learning model, identity information representative of an invariant identity of the first face; generating, by the expression machine learning model, expression information from first set of input information, wherein the expression information includes a defined set of expressions of the first face; generating, by the texture map machine learning model, the 2D texture maps of the first face in the plurality of expressions from the identity information and the expression information; and generating, by the mesh machine learning model, the 3D facial meshes of the first face in the plurality of expressions from the identity information and the expression information.

In some aspects, the techniques described herein relate to non-transitory computer-readable medium storing computer-executable instructions that when executed by a system of one or more computers, cause the one or more computers to perform operations including: accessing a first set of machine learning models trained to generate, via a latent variable space, a three-dimensional (3D) mesh and a plurality of two-dimensional (2D) texture maps corresponding to the three-dimensional mesh; obtaining a first set of input information configured to generate a first facial model having a first identity; generating, by the first set of machine learning models, the first facial model from the first set of input information, wherein the first facial model includes a plurality of 2D texture maps and a 3D facial mesh of a first face; accessing a second machine learning model trained to generate photorealistic 2D images based on an input image; and generating, using the second machine learning model, at least one target photorealistic 2D image based on the first facial model; accessing a differentiable rendering engine, wherein the differentiable rendering engine is configured to modify facial models based on target 2D images; modifying, by the differentiable rendering engine, the first facial model based on the at least one target photorealistic 2D image; and outputting, by the differentiable rendering engine, an enhanced first facial model, wherein the enhanced first facial model includes a modified version of the plurality of 2D texture maps and a modified version of the 3D facial mesh.

In some aspects, the techniques described herein relate to a non-transitory computer-readable medium, wherein, prior to generating the at least one target photorealistic 2D image, the instructions further configure the one or more computers to perform operations including: accessing a diffusion-based machine learning model configured to increase resolution of a 2D image; generating, using the diffusion-based machine learning model, an upscaled 2D texture map for each of the plurality of 2D texture maps, wherein a resolution of each of the plurality of 2D texture maps is increased to a higher resolution.

The techniques described herein therefore improve upon the functioning of prior software-based techniques to generate character facial models and animation thereof. As described above, prior techniques relied on designers to manually create facial models and then adjust the facial models to create expressions. In contrast, the techniques described herein may allow for the automated generation of facial models for a virtual character. Advantageously, the automated generating of facial models can use generative machine learning models. Using generative modeling techniques, complicated facial models and animations may be quickly generated.

The systems, methods, and devices of this disclosure each have several innovative aspects, no single one of which is solely responsible for all of the desirable attributes disclosed herein.

Although certain embodiments and examples are disclosed herein, inventive subject matter extends beyond the examples in the specifically disclosed embodiments to other alternative embodiments and/or uses, and to modifications and equivalents thereof.

The details, including optional details, of one or more embodiments of the subject matter of this specification are set forth in the accompanying drawings and the description below. Other optional features, aspects, and advantages of the subject matter will become apparent from the description, the drawings, and the claims.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

FIG. 5A illustrates a block diagram of an example differentiable rendering engine.

Like reference numbers and designations in the various drawings indicate like elements.

DETAILED DESCRIPTION

Overview

This specification describes, among other things, technical improvements with respect to generation of facial character models, facial expressions, texture maps, and meshes for virtual characters for use in a virtual environment, such as an electronic game or digital media content. As will be described, a system described herein (e.g., the facial model generation system) may generate realistic facial models, facial expressions, texture maps, and meshes. Advantageously, the system may allow for substantially automated generation of facial models, including the generation of, diffuse maps, normal maps, roughness maps, meshes, animation of facial expressions, and so on. While electronic games are described, it may be appreciated that the techniques described herein may be applied generally to generation of facial models and expressions for virtual characters. For example, digital media content (e.g., animated content in TV shows, movies, etc.) may employ the techniques described herein.

Manually generating the facial models, including textures, meshes for virtual characters can be a time consuming process. Further, existing techniques to automate the process of generating the facial models, textures, meshes, and expressions for virtual characters may be insufficient. For example, character facial models (and accompanying facial expressions, textures, and meshes) generated using existing techniques can be computationally expensive and/or result in low quality character facial models.

The facial model generation system described herein can advantageously rapidly generate character facial models based on use of a plurality of independent systems and models. The facial model generation system can include a character generation engine, an upscaling engine, a target generation engine, and a differentiable rendering engine. The various systems can work together to automate the generation and refinement of realistic human facial models. The character generation engine can generate a base facial model for a virtual character having a defined identity based on a set of input information received by the facial model generation system. The character generation engine can generate texture maps and meshes for the facial model of the virtual character. The system can utilize the differentiable rendering engine to modify the base facial model to create a realistic target facial model.

Example Block Diagrams—Facial Model Generation System

Figure 1A:
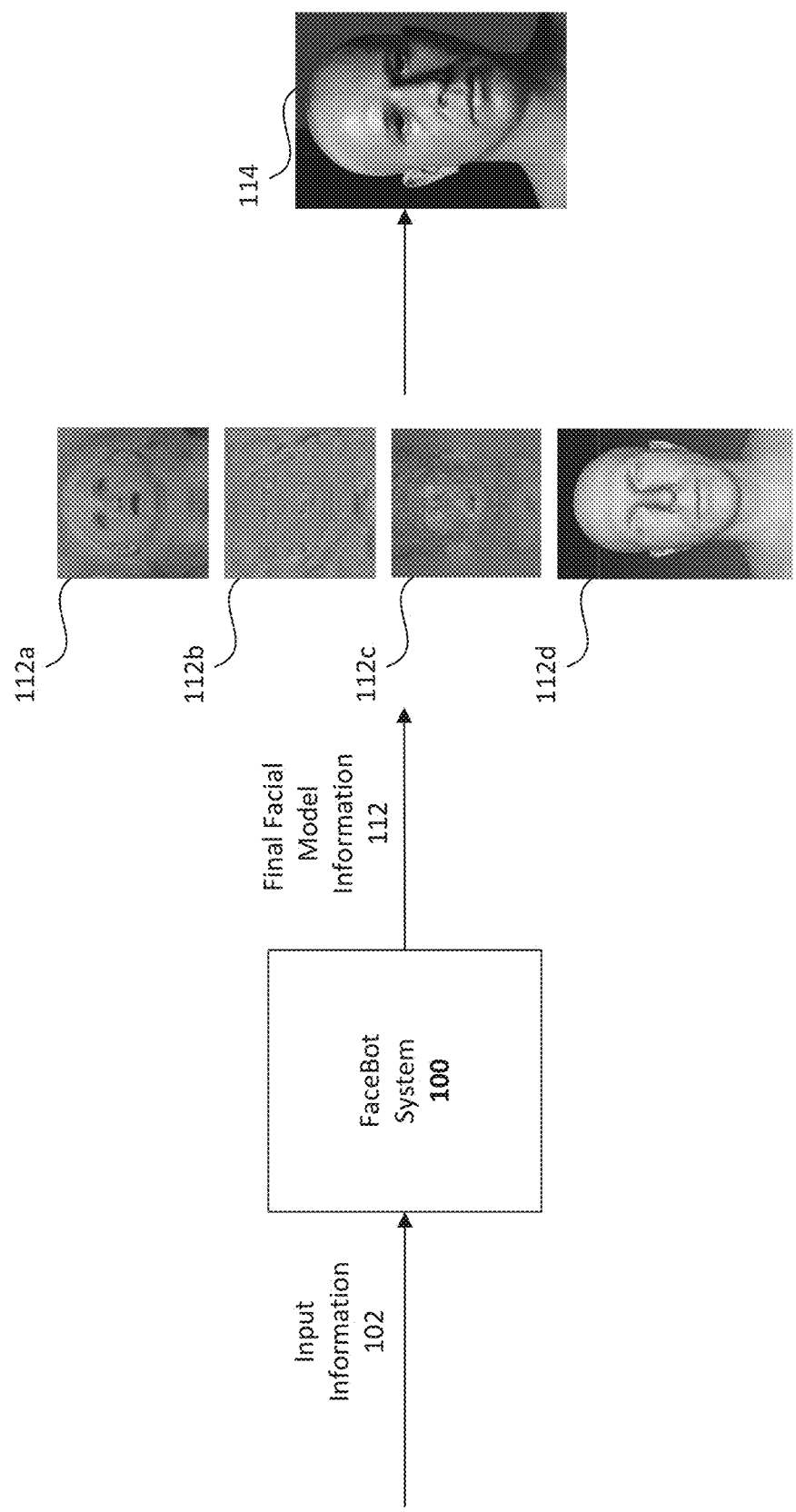
FIG. 1A illustrates a block diagram of an example facial model generation system.

FIG. 1A illustrates a block diagram of an example facial model generation system 100. In the illustrated embodiment, the facial model generation system 100 can receive input information 102 and generate final facial model information 112, which includes texture maps 112*a-c* and meshes 112*d*, which can be used to generate a realistic three-dimensional (3D) character facial model 114. The facial model generation system 100 may, in some embodiments, be a system of one or more computers, one or more virtual machines executing on a system of one or more computers, and so on. In some embodiments, the facial model generation system 100 may be implemented as a module, or software (e.g., an application), which may execute on a user device (e.g., a laptop, tablet, console gaming system, and so on).

The input information 102 can vary based on the type of virtual character is being generated. In instances where the virtual character has a previously defined identity, such as a virtual character based on a real person or a fictional character based on existing works or art, the input can include one or more images of the requested virtual character. In other instances, the virtual character can be generated using one or more inputs for parameterized variables. The parameterized variables can be user customized, such as the output of a design interface, resulting in a virtual character that corresponds to the customized input. The parametrized inputs may be represented by a user interface including inputs representing at least some or all of the parameterized variables associated with a virtual character. For example, a user may select an older female originating from India. The parameterized variables can correspond to one or more facial features associated with the inputs. In some instances, the values of the of some or all of the parameterized variables can be automatically generated and/or pseudo-randomly generated. The parametrized variables can be derived from facial images, texture maps, meshes, etc. of real-life persons. For example, 2D videos of faces preforming a predefined range of motions may be analyzed to generate the parameterized ranges of variables. Each of the parameterized variables may be bound to a specified range, such that the resulting virtual character has realistic human features.

The facial model generation system 100 can use the input information to determine an identity of the virtual character and generate realistic character facial models 114 that correspond to the identity of virtual character. The facial model generation system 100 can include the models and engines described herein to generate the target facial information 112 from the input information 102. The target facial information 112 can include target diffuse maps 112*a*, target normal maps 112*b*, target roughness maps 112*c*, and target meshes 112*d*. While FIG. 1A illustrates one diffuse map 112*a*, one realistic normal map 112*b*, one realistic roughness map 112*c*, and one realistic mesh 112*d*, each corresponding to a neutral expression, it may be appreciated that facial information 112 may also include target diffuse maps 112*a*, target normal maps 112*b*, target roughness maps 112*c*, and target meshes 112*d* that each correspond to expressions (e.g., smiles, grimaces, speaking, etc.). The compiled character facial model 114 can include the facial information 112 corresponding to a neutral state and the facial information 112 corresponding to one or more expressions.

Figure 1B:
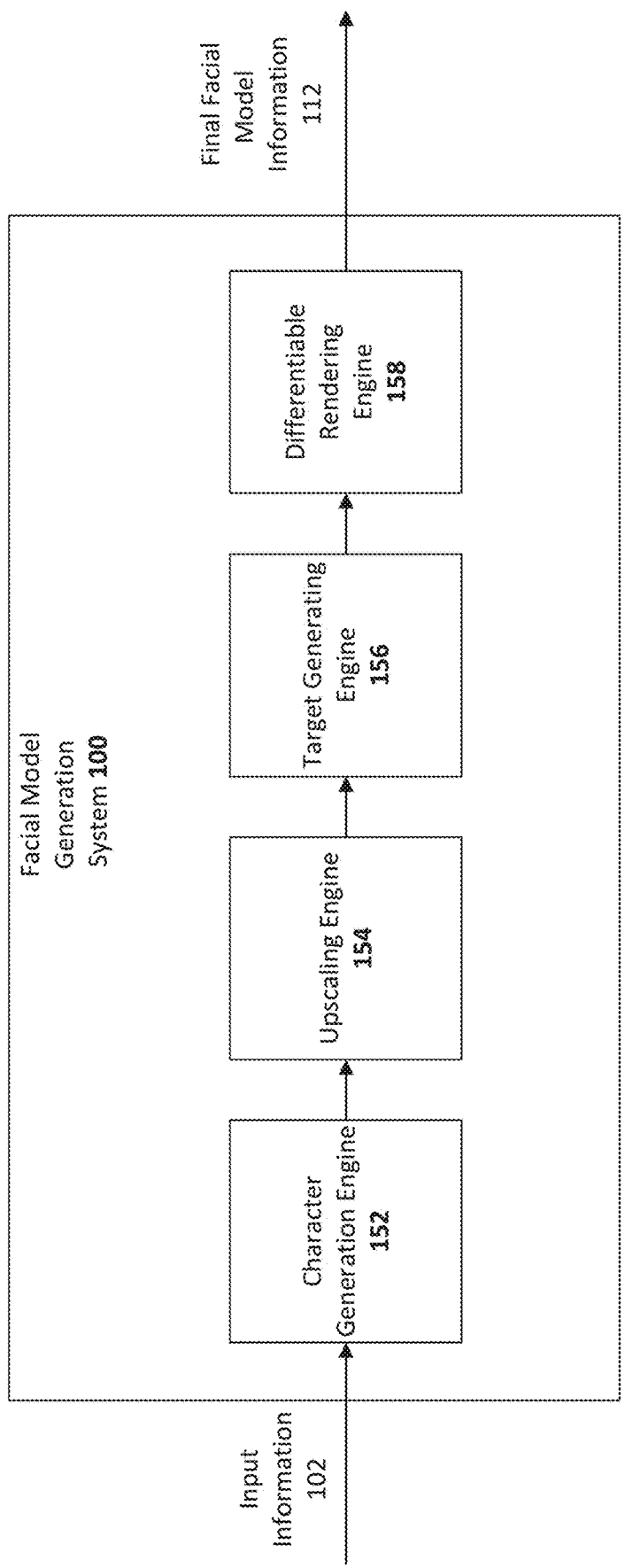
FIG. 1B illustrates another block diagram of an example facial model generation system.

FIG. 1B illustrates another block diagram of an example facial model generation system 100. As illustrated, the facial model generation system 100 can include a character generation engine 152, an upscaling engine 154, a target generating engine 156, and a differentiable rendering engine 158.

As will be described in more detail with respect to FIGS. 2A-2E, the character generation engine 152 can utilize machine learning models to generate a base facial model of a virtual character from input information 102. The facial model can refer to the texture maps and meshes of a virtual character. The facial model may have individual texture maps that represent different expressions of the virtual character, such as a neutral state and expressions (e.g., smiles, grimaces, speaking, etc.). The facial model generated by the character generation engine 152 may have deficiencies or otherwise undesirable or unrealistic characteristics. For example, the character model generated by the character generation engine 152 may have missing attributes, artifacts, unrealistic expressions, a low resolution, and or other deficiencies that make the model undesirable as a facial model for the virtual character.

As will be described in more detail with respect to FIGS. 3A-3C, the upscaling engine 154 can utilize machine learning models to upscale textures maps of the character model. For example, the upscaling engine 154 can convert the texture maps generated by the character generation engine 152 into higher resolution images.

As will be described in more detail with respect to FIG. 4, the target generating engine 156 can utilize machine learning models to generate a photorealistic target image of the virtual character. The target generating engine 156 can utilize the upscaled texture maps generated by the upscaling engine 154 and the meshes generated by the character generation engine 152 as input. The reference image generated by the target generating engine 156 can be used as convergence information by the differentiable rendering engine 158 to tune the base facial model.

As will be described in more detail with respect to FIGS. 5A and 5B, the differentiable rendering engine 158 can utilize differentiable rendering programs to tune the texture maps and meshes of the base facial model. The target image generated by the target generating engine 156 may be used by the differentiable rendering programs to generate one or more parameters to use as convergence information (also referred to as the "ground-truth," or as a "convergence point"). The differentiable rendering programs can tune the parameters of the texture maps and meshes of the character model until the parameters converge onto, and/or approximate, the convergence information. The tuned texture maps and meshes can be output as final facial model information 112. In some embodiments, the final facial model information 112 may be used to animate the facial model.

Example Block Diagrams—Character Generation Engine

Figure 2A:
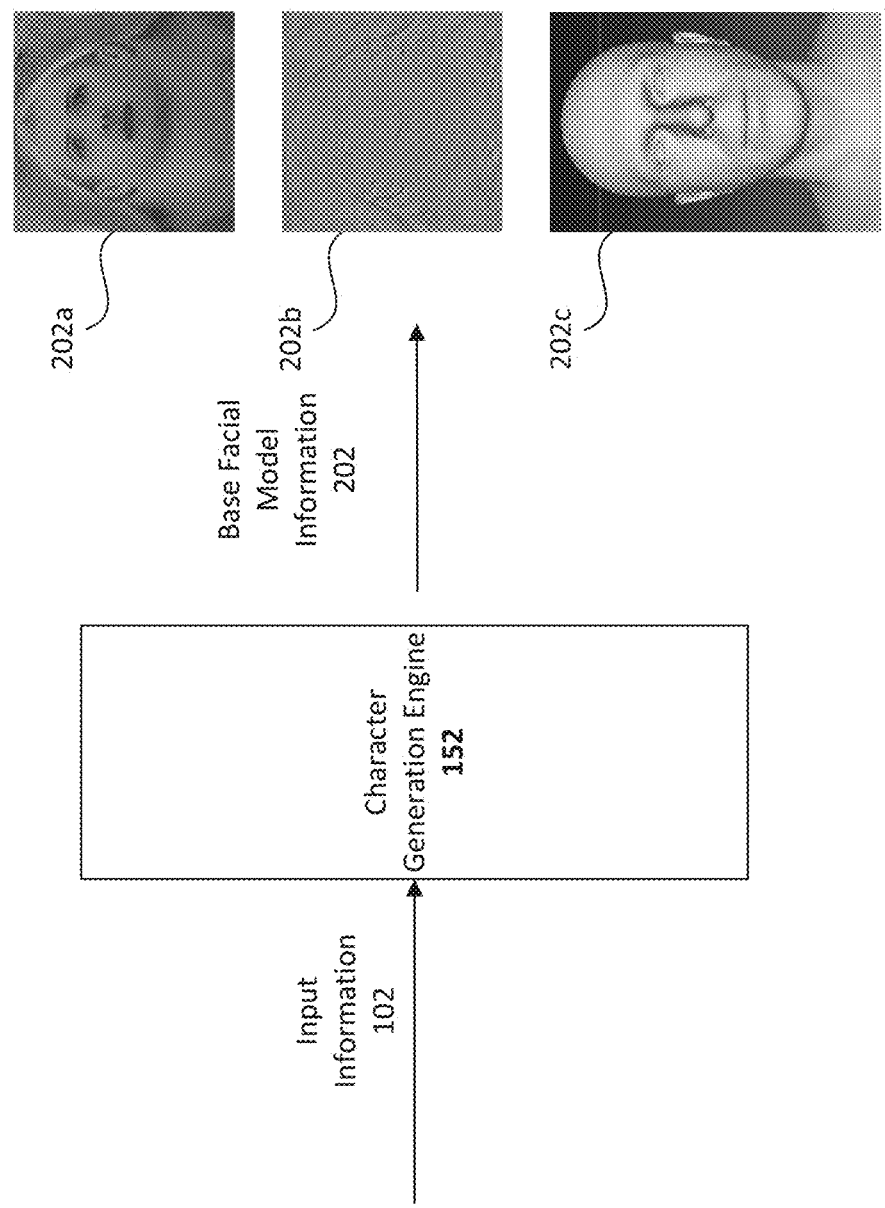
FIG. 2A illustrates a block diagram of an example character generation engine.

FIG. 2A illustrates a block diagram of an example character generation engine 152. The character generation engine 152 can be utilized by the facial model generation system 100 to generate diffuse maps, normal maps, and meshes of a facial model for use by other components of the facial model generation system 100. In the illustrated embodiment, the character generation engine 152 can receive the input information 102 and generate base facial model information 202. The base facial model information 202 can include diffuse maps 202a, normal maps 202b, and meshes 202c, which can correspond to a neutral state and one or more expressions.

The character generation engine 152 can include various machine learning models, such as the models discussed below with respect to FIGS. 2B-2E, to generate the base facial model 202 based on the input information 102. One or more images of target face may be provided as input information 102. The input information 102 may be provided using customized parameters to generate a target face. Advantageously, character generation engine 152 can generate a base facial model 202 for random and/or partially random faces when the input information 102 includes randomly generated and/or partially randomly generated parameterized variables.

Figure 2B:
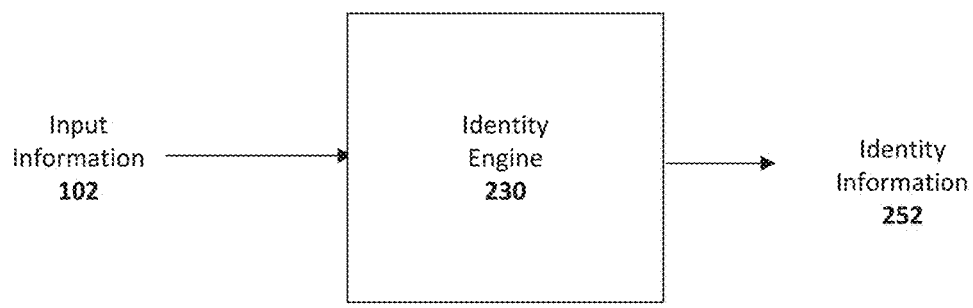
FIG. 2B illustrates a block diagram of an example identity engine.

FIG. 2B illustrates a block diagram of an example identity engine 230. In this example, the identity engine 230 can receiving the input information 102 and generating identity information 252. For example, the input information can be one or images of a desired virtual character. The identity engine 230 may be utilized to generate identity information 252 from the input information 102 for use in the other models and engines of the character generation engine 152.

The identity engine 230 can use machine learning techniques such as a machine learning model trained to generate identification representations based on an input face of a person. The identity engine can generate a high-quality face mapping from input information 102 using deep learning architectures such as a variational autoencoder, ZF-Net, and Xception. Though not perfect, the identification representation can be invariant to occlusion, pose, lighting and even age, and other factors that would affect perceptive differences between different images of the same person. The identification representation is representative of an encoding that provides an identity of a person, which can also be referred to as the identity or identity information 252 of a person.

Advantageously, once the identity engine 230 is trained, identity information 252 of a virtual character may be newly generated from input information 102. For example, an encoding that provides an identity representation of a person may be generated based on an image of a desired virtual character or of a randomly generated and/or partially randomly generated face. The input may be used to generate corresponding identity information 252.

Figure 2C:
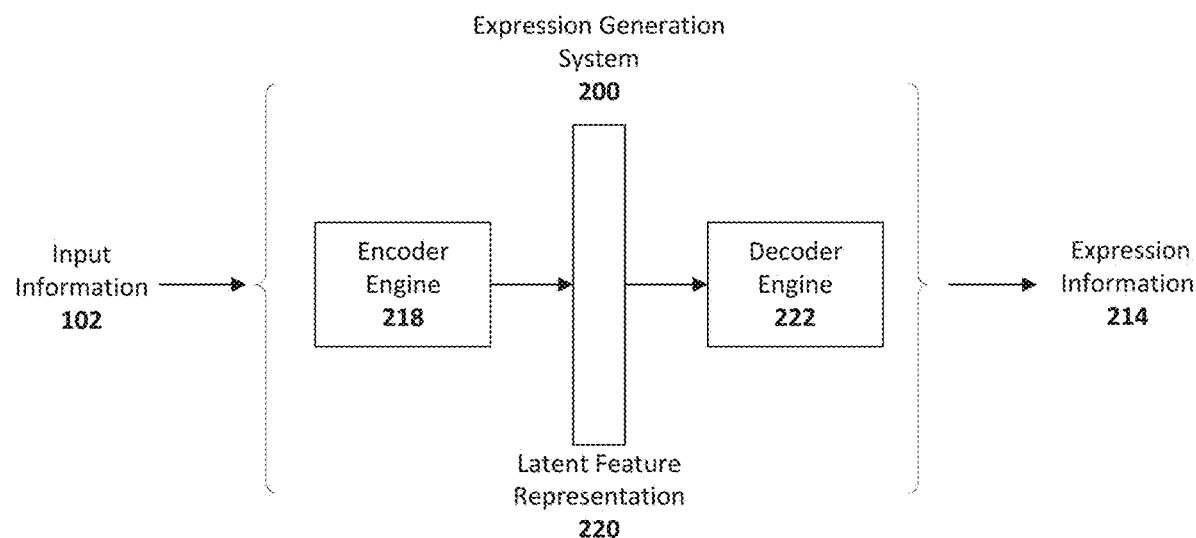
FIG. 2C illustrates a block diagram of an example expression generation system 200.

FIG. 2C illustrates a block diagram of an example expression generation system 200. The expression generation system 200 may be utilized as part of the character generation engine 152 to generate expression information 214 from the input information 102 for use in the other models and engines of the character generation engine 152.

Facial expressions for an in-game character may be defined, at least in part, based on distinct positions of the facial features of the in-game character. The distinct positions, for example, may be blended together to generate the expression. As an example, each expression may represent a discrete sample of an animation sequence to be performed by the in-game character. Thus, if motion is to depict talking, each expression may represent a snapshot of the facial features during speaking. The system may advantageously learn a latent feature space which encodes observable features defining these expressions (e.g., positions of facial features). As an example, the system may obtain a multitude of expressions of real-life persons for training. For example, there may be thousands, hundreds of thousands, and so on, obtained expressions. These expressions may, in some embodiments, be obtained from video of the real-life persons. Thus, certain expressions may represent discrete snapshots of a real-life person.

The encoder engine 218 can be used to map input expression information to a latent feature representation 220. The autoencoder may also include a decoder engine 222 to generate reconstructed expression information 214 from input information 102 based on the latent feature representation 220. The expression generation system 200 can generate expression information 214 corresponding to input information 102 (such as a randomly generated and/or partially randomly generated face) by passing the input information 102 through the trained decoder engine 222.

The expression generation system 200 may use a variational autoencoder or an autoencoder, which can use unsupervised machine learning techniques capable of learning efficient representations of input data. The encoder engine 218 and decoder engine 222 may represent neural networks, such as dense (e.g., fully connected) neural networks. As described above, the output of the encoder engine 218 may be provided into the decoder engine 222 through a shared layer of variables (e.g., hidden variables) which may be referred to as the latent feature representation of the input. As may be appreciated, the output of the encoder engine 218 may be obtained via a forward pass of input expression information through layers forming the encoder engine 218. Advantageously, the latent feature representation 220 may be of lower-dimensions than the input expression information. Thus, the latent feature representation 220 may be an encoding of input expression information with respect to a latent feature space. The encoding may comprise values for a multitude of latent variables.

Additionally, the expression generation system 200 can be trained to account for varying fields of view in the input data.

In order to train the model, the capture data can be synthetically augmented and manipulated so that the model can experience conditions of varying fields of view. The input data can be translated, scaled, rotated, or otherwise manipulated to provide the expression generation system 200 with examples of different conditions. This can improve the chances that the expression generation system 200 will learn to retarget and properly analyze input data after training.

Once generated, for example when the decoder engine 222 is trained, the resulting latent feature distributions may be substantially continuous. Thus, samples of the distributions may be obtained which do not precisely correspond with mappings of input expression information onto the latent feature space. In this way, the decoder engine may generate new expressions based on the samples. These expressions may advantageously represent realistic expressions of persons.

Advantageously, once the decoder model 222 is trained, the new expressions information 214 of a person may be newly generated from input information 102. For example, the latent feature distributions may be generated based on randomly generated and/or partially randomly generated input expression information.

The system can use the system to create a predefined set of expressions, such as traditional range of motion (ROM) expressions, which includes a person going through a defined series of facial motions in an attempt to capture all possible muscle activations of the persons face. In which case, the expression generation system can synthetically generate a standard set of expressions based on the input information of the virtual character. The expression generation system 200 can generate range of motion data for the system based on the identity of the virtual character.

Figure 2D:
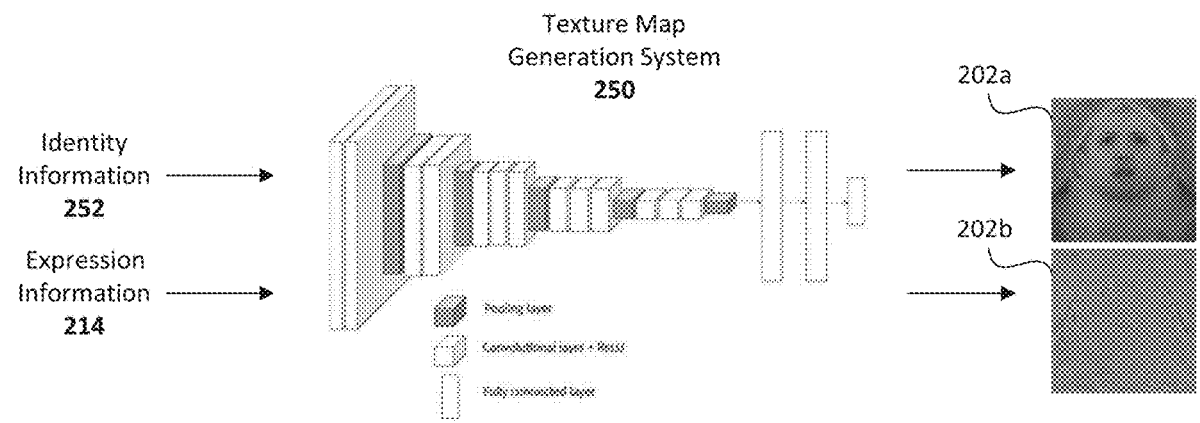
FIG. 2D illustrates an example of the application of a texture map generation system.

FIG. 2D illustrates an example of the application of a trained texture map generation system 250. The texture map generation system 250 may be utilized as part of the character generation engine 152 to generate texture information, such as diffuse maps 202a and normal maps 202b.

The input to the texture map generation system 250 can include expression information 214 and identity information 252. The expression information 214 can be generated by the expression generation system 200 and can include 2D images/frames associated with individual expressions. The identity information 252 can be generated by the identity engine 230. The ROM information 214 can be a full set of range of motion data that is generated based on expression information 214 generated by the expression generation system 200. The embodiment illustrated of the texture map generation system 250 is an example of a convolutional neural network ("CNN"). As described herein, the trained CNN can include an input layer, a plurality of hidden layers (e.g., convolutional layers, pooling layers, fully connected layers, etc.), and an output layer. At the input layer, the texture map generation system 250 can receive the expression information 214 and the identity encoding 212 for the person. Each 2D image/frame of the range of motion information 214 can be processed separately. The texture map generation system 250 can generate and output at the output layer one or more texture maps, such as a diffuse map 202a and a normal map 202b for each input 2D image received.

Advantageously, the texture map generation system 250 is a separate and distinct process that can be used in connection with the output generated by expression generation system 200 to create textures associated with an image of a person that corresponds to the input information 102. These textures can provide information used for animation of a 3D model of the person. As a continuation of the animation process for a specific virtual character, the texture map generation system 250 can be configured to generate the texture maps for the virtual character for each of the images generated for the range of motion animation. In doing this the system can generate a textures that are representative of a defined set of facial positions of facial features of the person based on a single image. This can provide information used for animation of a 3D model of the person.

Figure 2E:
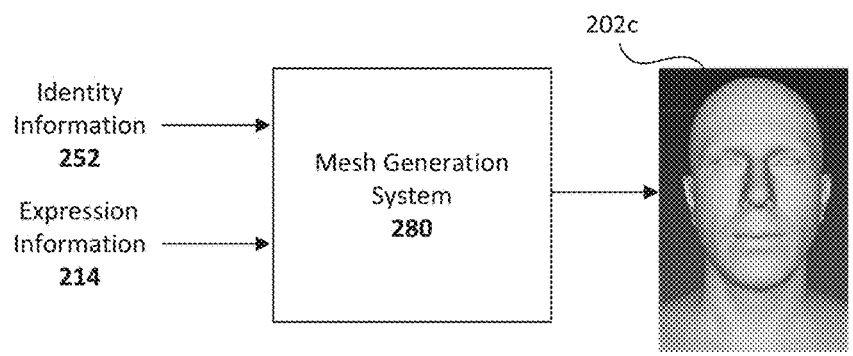
FIG. 2E illustrates embodiments of a mesh generation system for generating and outputting a mesh of a facial model of a virtual character.

FIG. 2E illustrates embodiments of a mesh generation system 280 for generating and outputting a mesh of a face and head of a virtual character. The mesh generation system 280 may be utilized as part of the character generation engine 152 to generated meshes, such as meshes 202c. For example, mesh generation system 280 may utilize the identity information 252 generated by the identity engine 230 and the expression information 214 generated by the expression generation system 200. The output of the mesh generation system 280 may form a portion of the generated neutral and expression information 202 described in FIG. 2A.

The meshes generated by the mesh generation system 280 can be based on a 2D image of a face of a person in conjunction with outputs generated by the identity engine 230, the expression generation system 200, and texture map generation system 250. The mesh generation system 280 can be a machine learning model trained to generate meshes, such as meshes 202c, based on input identity information 252 and expression information 214.

In some embodiments, the mesh generation system 600 can use a convolutional neural network. A convolutional neural network can consist of an input layer, multiple hidden layers and an output layer. The convolutional neural network is a feed-forward neural network and the middle layers are hidden because their inputs and outputs are masked by the activation function and final convolution. The hidden layers include layers that perform convolutions. This may include one or more layers that does multiplication or other dot product, and its activation function, such as ReLU. The layers may include a plurality of other layers such as pooling layers, fully connected layers, and normalization layers.

The mesh generation system 280 may be trained using various images, capture data, photogrammetry data, mesh data, texture map data including normal texture map data and diffuse texture map data, range of motion data, model data, and outputs from the identity engine 230, and the like that correspond to person samples. It may be appreciated that thousands, hundreds of thousands, millions, and so on, samples of these types of data may be input to the mesh generation system 280. The training data used to train the mesh generation system 280 can be the same data used to train the texture map generation system 250.

The mesh generation system 280 can use the expression information 214 and identity information 252 to generate the character mesh 202c and expression animations. In some embodiments, the mesh generation system 280 can be a generative model (e.g., an autoencoder or variational auto encoder) that can be trained to generate a facial model mesh.

In some embodiments, the mesh generation system 280 can be trained to generate animation data for the mesh. The mesh generation system 280 can be configured to correlate the facial characteristics of the mesh with the facial characteristics of the facial expressions, such as the expression information 214 generated by the expression generation system 200. The model can be trained to reconstruct the 2D input expression on the 3D mesh. The expressions may be used as a condition in a generative model, such as a conditional variational autoencoder. Advantageously, once trained, the machine learning model may be used to generate realistic expressions and animations via sampling of a latent feature space. As an example, based on the latent feature space, each of the expressions from the range of motion data may be generated for an animation sequence.

The machine learning model may be trained to reconstruct an input expression given one or more previous expressions. For example, the input expression and previous expressions may be obtained from the 2D range of motion data. Advantageously, once trained the machine learning model may be used to generate realistic animations via sampling of a latent feature space. As an example, a sequence of expressions may be accessed, such as the expression information 214. Based on the latent feature space, a new expression may be generated for the sequence. Via repeating this technique, for example using autoregressive methods, a multitude of new expressions may be generated for an animation.

Realistic expression animations may be generated via autoregressive techniques. For example, a particular autoencoder (e.g., a conditional variational autoencoder) may be trained using an input expression and one or more prior expressions as conditions. Thus, the particular autoencoder may be trained to reconstruct the input expression given the one or more prior expressions. Advantageously, once trained the particular autoencoder may be used to generate a sequence of expressions for blending together as animation. As an example, a sequence of expressions may be used to sample a latent feature space generated based on the particular autoencoder. Via sampling the latent feature space, a new expression may be generated. This new expression may be generated such that it is a realistic next expression in the sequence of expressions.

While the process described with respect to FIGS. 2A-2E are advantageous for generating a base facial model. The base facial model information 202 may correspond to an unrealistic looking face. For example, base facial model information 202 generated using input information 102 with randomly generated and/or partially randomly generated parameterized variables may result to a combination of unrealistic facial features. As such, the base facial model information 202 can undergo further processing and optimizing by the facial model generation system 100 to increase the resolution and realism of the base facial model information 202.

Example Block Diagrams—Upscaling Engine

Figure 3A:
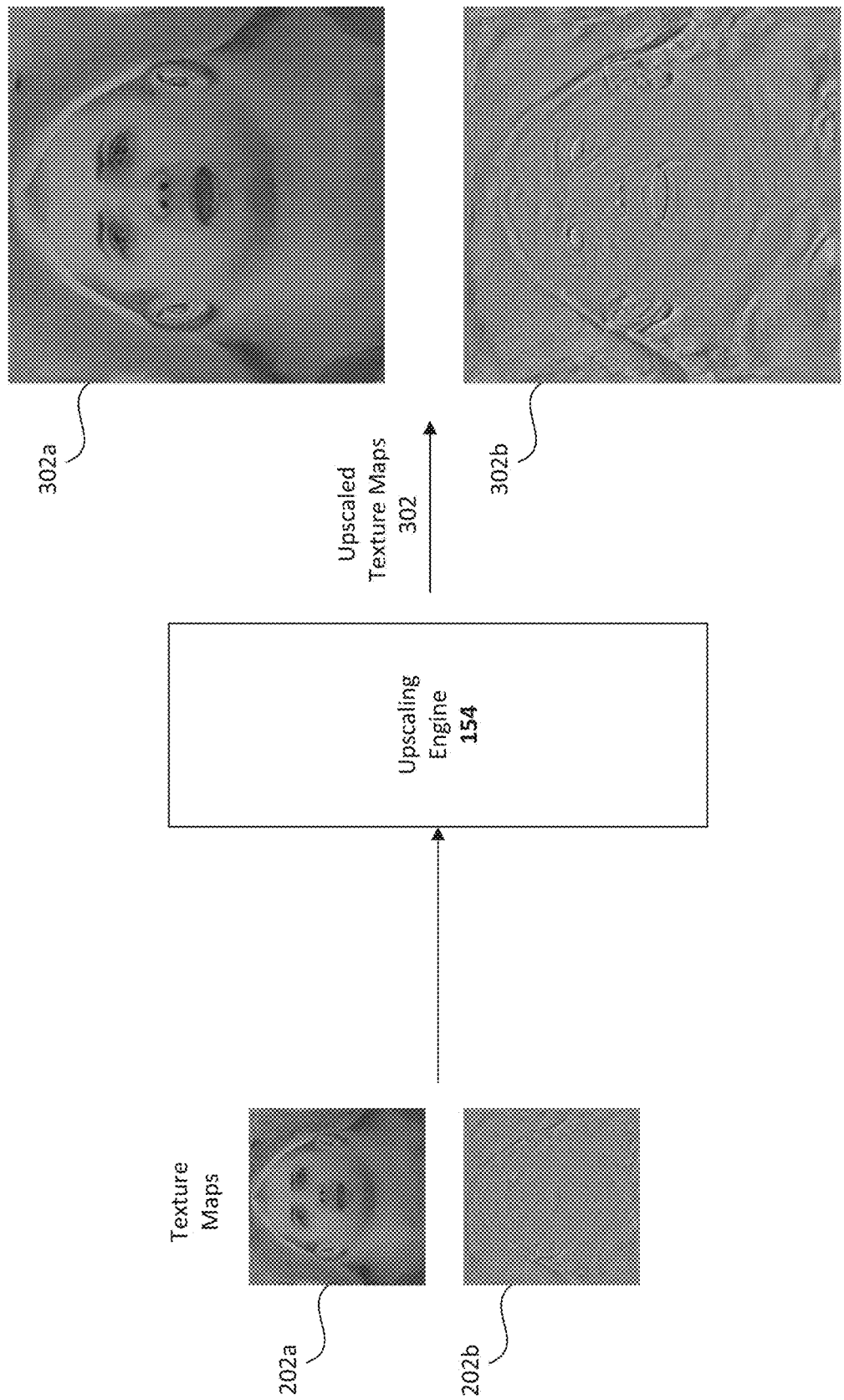
FIG. 3A illustrates a block diagram of an example upscaling engine.

FIG. 3A illustrates a block diagram of an example upscaling engine 154. The example upscaling engine 154 can be utilized by the facial model generation system 100 to upscale the texture maps, including diffuse maps 202a and normal maps 202b generated by the character generation engine 152. The upscaling engine can receive the texture maps (diffuse maps 202a and normal maps 202b) as input and generate upscaled texture maps 302 of a character facial model. The upscaled texture maps 302 can include upscaled diffuse maps 302a and upscaled normal maps 302b corresponding to diffuse maps 202a and normal maps 202b. facial model generation The upscaling engine 154 can include one or more machine learning models, such as diffusion models, that are trained to process low resolution images into detailed high resolution images. For example, the upscaling engine 154 may utilize super-resolution via repeated refinement ("SR3"), diffusion models and/or cascade diffusion models ("CDM"), and/or other diffusion model or other machine learning model trained to upscale images.

The diffusion models may be trained using a large database of images. Each image may be degraded by progressively adding noise, such as Gaussian noise, to the image. Once trained, the diffusion model can invert the process and remove noise from a degraded image. A diffusion model may upscale an image by applying the noise reduction training to a low resolution image. The diffusion model may interpret the low resolution image as a high resolution image with added noise. Then, based on the model training, remove the added noise, resulting in a high resolution image version of the original low resolution image.

Figure 3B:
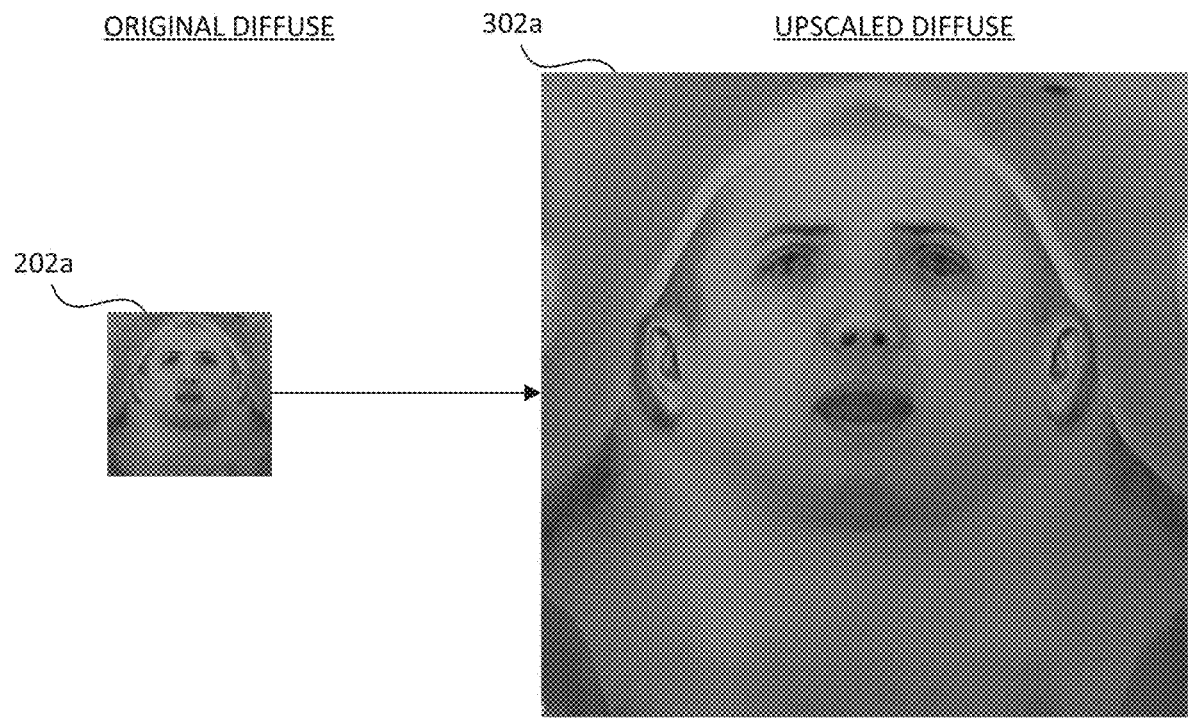
FIG. 3B illustrate an example of an upscaled diffuse map.
Figure 3C:
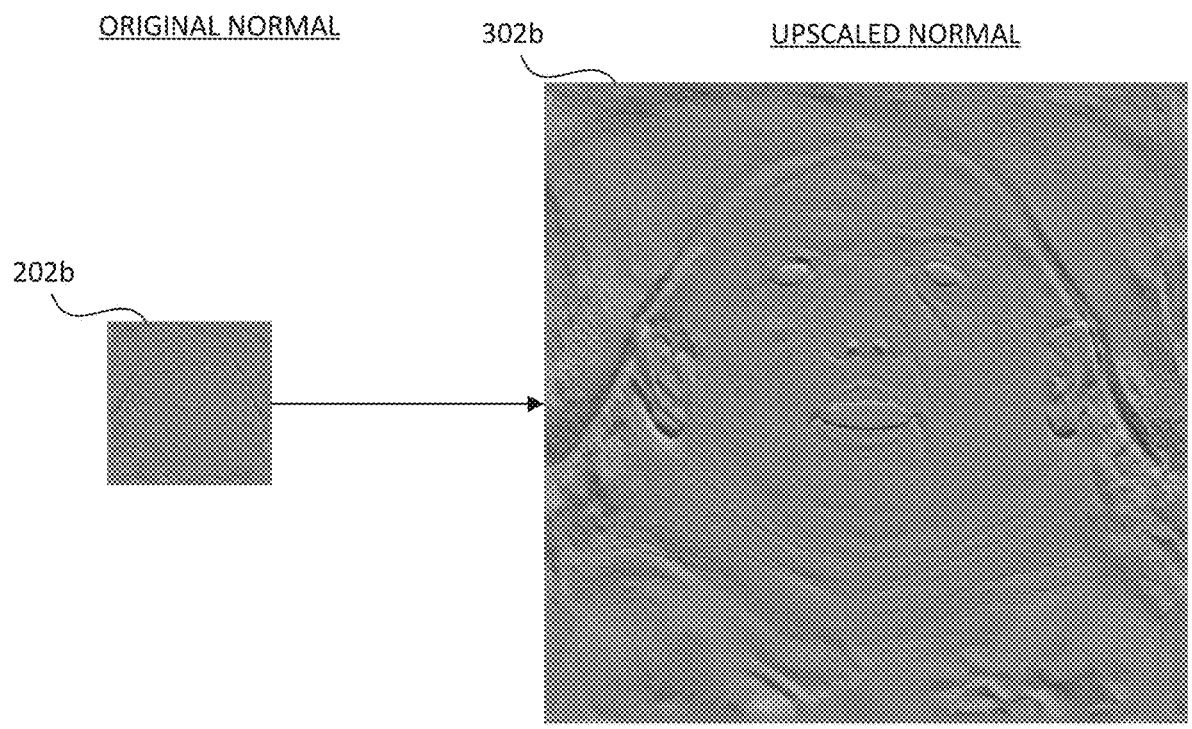
FIG. 3C illustrate an example of an upscaled normal map.

As is illustrated in FIGS. 3B and 3C, the upscaling engine 154 can utilize one or more diffusion models to upscale the diffuse maps 202a and normal maps 202b into an upscaled diffuse map 302a and an upscaled normal map 302b. In some embodiments, the upscaling engine 154 can utilize the diffusion models to upscale low resolution diffuse maps 202a and normal maps 202b having a resolution of 256×256 into upscaled diffuse map 302a and an upscaled normal map 302b having a resolution of 2048×2048 images. In some instances, the diffuse maps 202a and normal maps 202b can have a resolution of 512×512 and can be upscaled to a resolution of 2048×2048. The above examples are not intended to be limiting and low resolution images having a different size may be used by the upscaling engine 154 and result high resolution images having a different size.

Example Block Diagrams—Target Generating Engine

Figure 4:
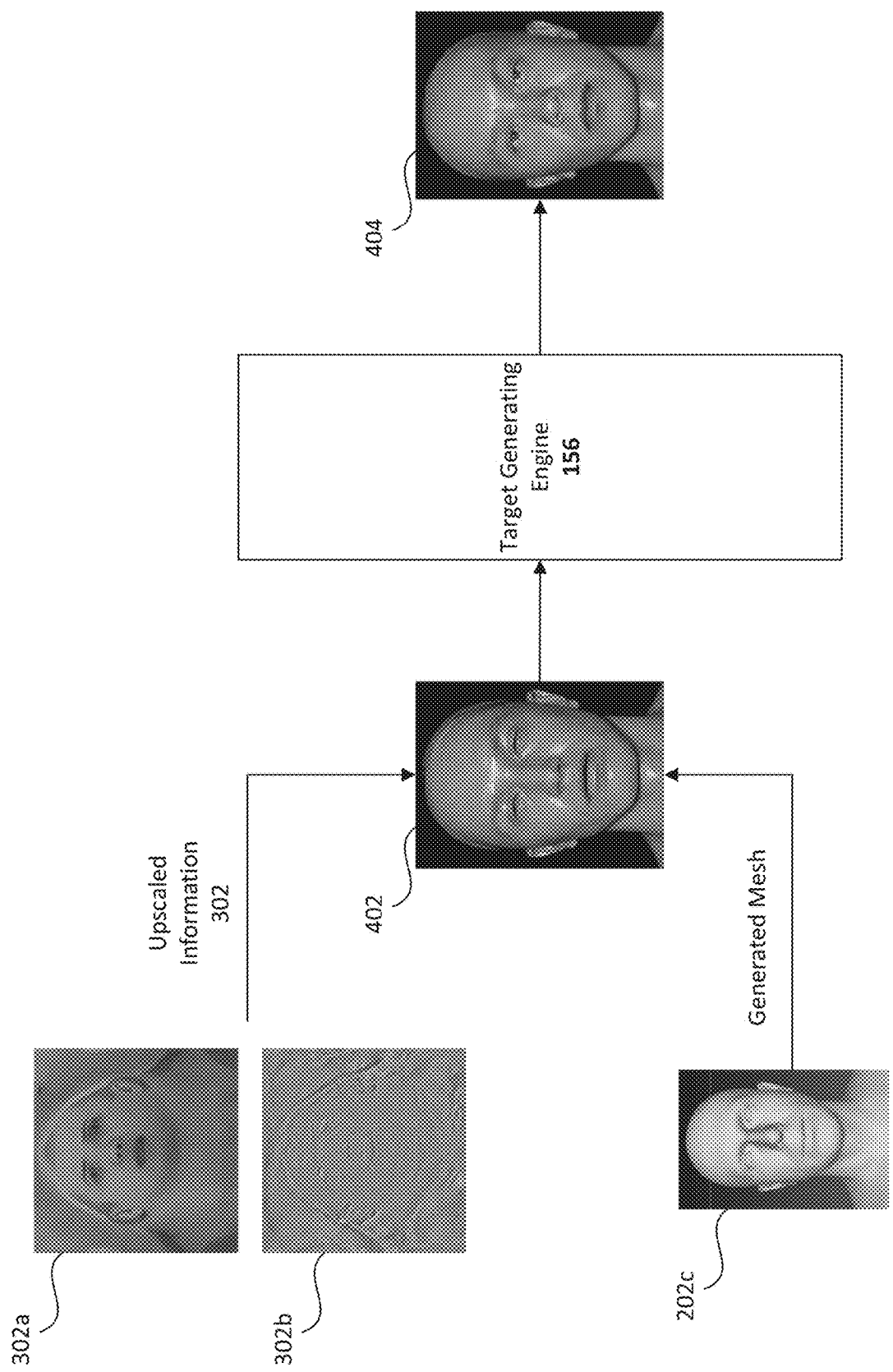
FIG. 4 illustrates a block diagram of an example target generating engine.

FIG. 4 illustrates a block diagram of an example target generating engine 156. The target generating engine 156 can be utilized by the facial model generation system 100 to generate a target image 404 from the upscaled texture maps 302 generated by the upscaling engine and the facial mesh 202c generated by the character generation engine 152. The target image 404 can be used, in conjunction with the upscaled texture maps 302 generated by the upscaling engine and the facial mesh 202c generated by the character generation engine 152, by the facial model generation system 100 in generating a refined character model.

The target generating engine 156 may utilize one or more machine learning models to generate the target image 404. The machine learning models can include picture-picture generative artificial intelligence ("AI") models. The picture-picture generative AI models can be machine learning models that are trained on large data sets to generate realistic images based on one or more input images. For example, a picture-picture generative AI model may input a drawing of a face and output a photorealistic image of a face based on the drawing.

The target generating engine 156 can combine the upscaled diffuse map 302a and the upscaled normal map 302b with the mesh 202c to generate a base facial model 402 of the character face. The base facial model 402 may have undesirable and/or unrealistic features. For example, the base model 402 may have a partially open mouth at the neutral or may have textures that interact with light sources in an undesirable way.

A rendered image of the base facial model can be provided as input to the target generating engine 156. The target generating engine 156 may use a picture-picture generative AI model to generate a realistic image 404 that can be used by the facial model generation system 100 to refine the texture maps 302 and the facial mesh 202c. Advantageously, the picture-picture generative AI model produce a photorealistic image of the character face before refining the texture maps 302 and the facial mesh 202c.

FIG. 4 illustrates the generation of a 2D target image 404 of a neutral expression. The target generating engine 156 can also generate target images 404 for any expression. It can be appreciated that each of the ground truth images 404 does not maintain the identity information 252. In some instances, the target images 404 generated by the target generating engine 156 may have different identity information. However, since each target image 404 is generated from a rendered base model 402 with the same identity information 252, the target images 404, when aggregated, can maintain substantially the same identity as indicated in the identity information 252.

While the realistic target images 404 produced by the target generating engine 156 can be photorealistic, the target images 404 cannot be used in animation themselves as they are not models, and there are no texture maps or meshes that accompany the target images 404. Further, the identity information 252 is not maintained in the target images 404. As such, the target images 404 for each of the neutral and expressions, may be used in aggregate by the facial model generation system 100 as a conversion point for the existing upscaled diffuse map 302a, upscaled normal map 302b and meshes 202c.

Example Block Diagrams—Differentiable Rendering Engine

FIG. 5A illustrates a block diagram of an example differentiable rendering engine 158. The differentiable rendering engine 158 can be utilized to refine the upscaled texture maps 302, the mesh 202c, and base roughness map 502 using the target image 404. The goal of the differentiable rendering engine 158 is generate a modified diffuse texture map 112a, modified normal texture map 112b, a modified roughness map 502, and a modified mesh 112d, which, when rendered, output a realistic image of the character model 114 that substantially matches the target image 404. The differentiable rendering engine 158 can utilize the target image 404 as a convergence target for the modified facial information 112. The differentiable rendering engine 158 can generate and output final facial model information 112 that can be used to generate a render of a realistic target character, such as the realistic character facial render 114.

The differentiable rendering engine 158 can include one or more differentiable rendering programs, such as, for example, Mitsuba 2 or Mitsuba 3. The differentiable rendering programs can compile simulations based on 2D images and/or 3D scenes. The simulations can utilize rules and varying points to construct, reconstruct, and/or refine parameters associated with a 3D rendering based on the rules. For example, differentiable rendering programs may construct a 3D scene from a 2D image and define 3D surfaces with parameters within the scene. As another example, differentiable rendering programs, may allow for refining parameters of an existing 3D scene. A differentiable program may utilize varying virtual light sources and varying virtual cameras to simulate the interaction of light and the 3D surfaces. A differentiable program may also utilize high dynamic range image (HDRI) positions to generate HRDI maps originating from the positions.

The differentiable rendering engine 158 can utilize the target image(s) 404 as convergence information for the upscaled diffuse map 302a, the upscaled normal map 302b, the base roughness map 502, and base meshes 202c. In some embodiments, the differentiable rendering engine 158 can exclude the upscaling process and use the base diffuse map 202a and normal map 202b. The base roughness map 502 may be a generic roughness map independent from the identity information 252 for a given character model. In some embodiments, the roughness map may be a map that is manually generated by an artist. The differentiable rendering engine 158 may utilize differentiable rendering programs to gather parameters from the target image(s) 404. These parameters may be used to iteratively modify the upscaled diffuse map 302a, the upscaled normal map 302b, the base roughness maps 502, and the meshes 202c of the base character model 202, until the base character model converges to the target images 404. The differentiable rendering engine 158 can be configured converge when facial model substantially matches the target image 404 within a defined threshold of difference. The differentiable rendering engine 158 can determine that the character model matches the target image 404 when differences between the character model and the target image satisfy a defined threshold. For example, during the model enhancement process, the differentiable rendering engine 158 can generate a 2D render the modified facial model and compare it to the target image 404. The differentiable rendering engine 158 may compare measurements of facial characteristics between the images to determine whether the differences between the facial characteristics satisfy a difference threshold. The difference threshold may be for individual facial characteristics, subsets of facial characteristics, and/or in aggregate for the entire facial model. The differentiable rendering engine 158 may compare renders from a plurality of different angles of the facial model with target images generated from corresponding angles.

Figure 5B:
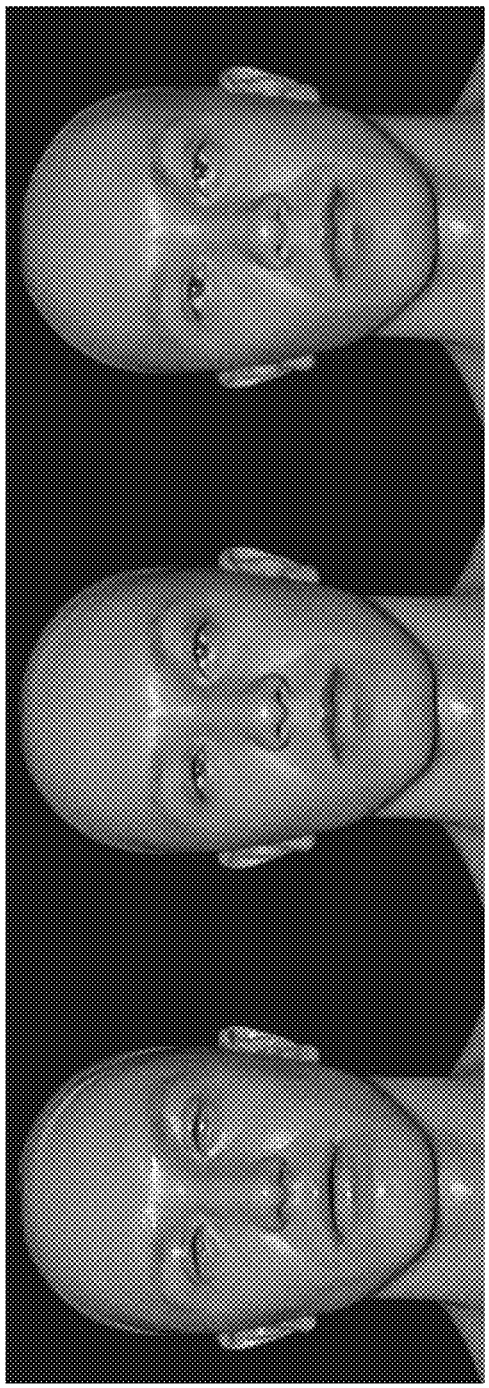
FIG. 5B illustrates an example image depicting the optimization of a character model.

FIG. 5B illustrates an example image 500 showing the optimization of a character model. Image 500 includes an initial model (e.g., base model 402), a reference image (e.g., target image 404) and a final model 112. The base model represents a character model produced by the facial model generation system that has not undergone optimization by the differentiable rendering engine 158. As illustrated, the base model has several undesirable imperfections, such as a standing open mouth, lack of eyeballs, unrealistic light reflection, unrealistic skin complexion, etc.

As illustrated, by providing the differentiable rendering engine 158 the target image 404, many of the imperfections of the initial model have been corrected using the differentiable rendering engine 158 in the target model. However, unlike the 2D target images 404 produced at the output of the target generating engine 156, the render of the target model illustrated in FIG. 5B is generated based on a 3D character model. The final character model 112 includes realistic diffuse maps 112a, realistic normal maps 112b, realistic roughness maps 112c, and realistic meshes 112d. which can be transferred and/or used for further development of a game application.

Example Flowcharts/Block Diagrams—Generating Optimized Texture Maps and Meshes

Generating texture maps and meshes for a person for use within an electronic game is of great importance and can be a time consuming process for electronic game designers. Further, optimizing texture maps and meshes to look realistic can consume additional time. Rapid generation of texture maps and meshes for realistic character models can allow for game designers to rapidly generate realistic in-game character animation of facial expressions. As will be described, the techniques described herein may allow for rapid generation and optimization of 2D texture maps and 3D meshes for a defined range of motion for a character. For example, texture maps, such as diffuse and normal texture maps, roughness maps, and meshes of a person may generated by facial model generation system 100 based on input data.

Figure 6:
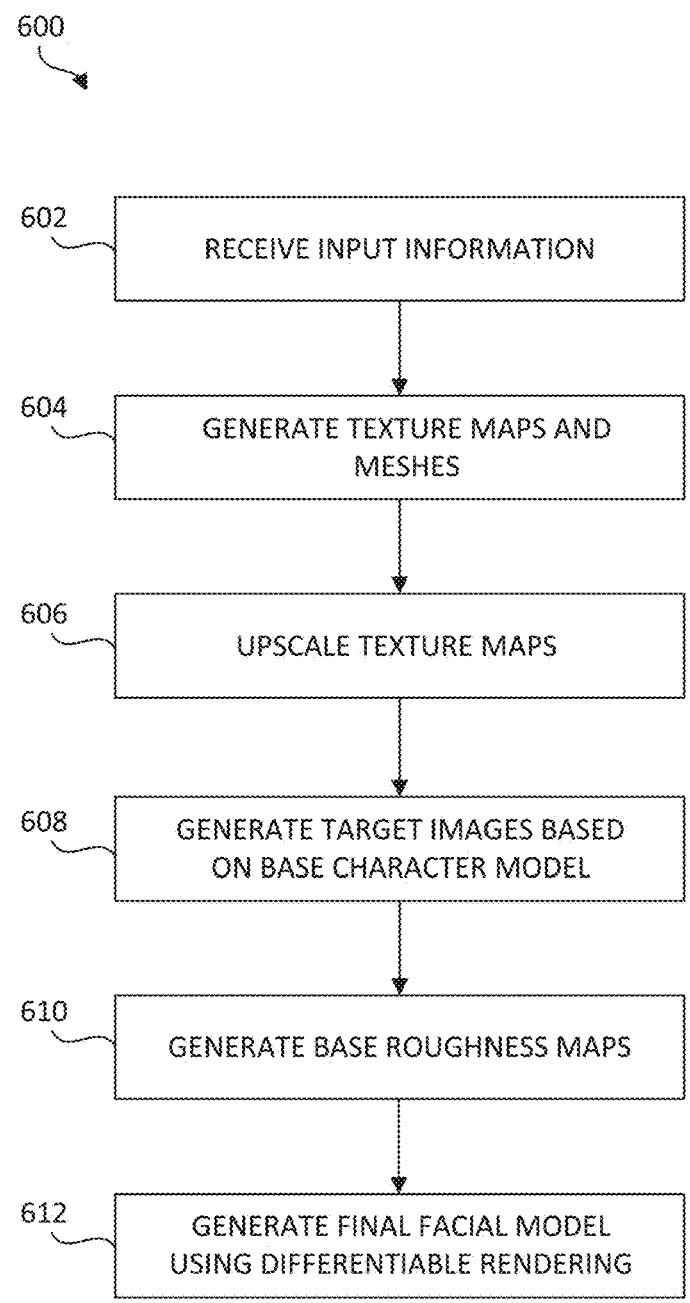
FIG. 6 is a flowchart of an example process for generating and optimizing texture maps of a person.

FIG. 6 is a flowchart of an example process 600 for generating and optimizing texture maps of a person. For convenience, the process 600 will be described as being performed by a system of one or more computers (e.g., the facial model generation system 100).

At block 602, the system obtains input information. The input information can include parameterized variables corresponding to one or more facial features. The input information 102 can vary based on the type of virtual character is being generated. In instances where the virtual character has a previously defined identity, such as a virtual character based on a real person or a fictional character based on existing works of art, the input can include one or more images of the requested virtual character. In other instances, the virtual character can be generated using one or more inputs for parameterized variables. The parameterized variables can be user customized, such as the output of a design interface, resulting in a virtual character that corresponds to the customized input. The parametrized inputs may be represented by a user interface including inputs representing at least some or all of the parameterized variables associated with a virtual character. For example, a user may select an older female originating from India. The parameterized variables can correspond to one or more facial features associated with the inputs. In some instances, the values of the of some or all of the parameterized variables can be automatically generated and/or pseudo-randomly generated.

At block 604, the system generates texture maps and meshes for a facial model based on the input information. The system can utilize various processes to generate described in more detail with respect to FIG. 7 to generate the meshes and texture maps of a facial model.

At block 606, the system upscales the diffuse and normal maps. The texture maps can be for a neutral expression. In some embodiments, the texture maps may be for an entire range of motion of the facial model. The system can utilize one or more diffusion models to upscale the diffuse maps and normal maps of the character model into an upscaled diffuse map and an upscaled normal map. In one embodiment, the system utilizes the diffusion models to upscale diffuse maps and normal maps corresponding to 256×256 images into upscaled diffuse maps and upscaled normal maps corresponding to 2048×2048 images. In another embodiment, the system utilizes the diffusion models to upscale diffuse maps and normal maps corresponding to 512×512 images into an upscaled diffuse maps and upscaled normal maps corresponding to 2048×2048 images. The above examples are not intended to be limiting and images of vaiour low resolutions may be used by the system and to generate other high resolution image sizes.

At block 608, the system generates target images. The target images may be photorealistic images of the neutral and various expressions for the facial model. The target images can be used as target images by the system. The system can combine the upscaled diffuse maps and the upscaled normal maps with the meshes of a character model to generate a base facial model. As may be appreciated, the base facial model may have undesirable and/or unrealistic features that may result in an undesirable animation outcome. For example, the base model may have a partially open mouth at the neutral or may have textures that interact with light sources in an undesirable way. Such undesirable features may be intentional, such as to save on processing and/or training time of the preceding models.

The system may use the rendered base model may as an input image to a picture-picture generative AI model to generate a realistic ground truth image that can be used by the system to optimize the base model. Advantageously, the large training base of the picture-picture generative AI model may allow the system to save resources on the other processes. For example, the initial character models generated by the system do not necessarily need be photorealistic character models.

It can be appreciated that each of the ground truth images do not maintain the identity of the character model. As such, each individual ground truth image (e.g., the ground truth at a neutral expression and the variety of expressions) may have visually varying, though likely similar, identities. However, since each ground truth image is generated from a rendered base model with the same identity, the ground truth images, when aggregated, can maintain substantially the same identity as the base model.

While the realistic ground truth images produced by the system are photorealistic, the ground truth images cannot be used in animation themselves as they are not models (e.g., there are no texture maps or meshes that accompany the ground truth images). Further, the identity of the character model is not maintained in the ground truth images. As such, the ground truth images for each of the neutral and expressions may be used in aggregate by the system as a conversion point for the existing upscaled diffuse maps, upscaled normal maps and meshes generated for the character model.

At block 610, the system generates base roughness maps. The base roughness maps may be generic roughness maps independent from the identity of the character model. In some embodiments, the roughness map may be a map that is manually generated by an artist.

At block 612, the system can generate a final facial model using differentiable rendering. The differentiable rendering engine can use the upscaled diffuse maps, the upscaled normal maps, the generic roughness maps, the meshes of the character model, and the target image(s) to generate the final facial model.

The differentiable rendering engine can utilize the target images as convergence points for the upscaled diffuse maps, the upscaled normal maps, the base roughness maps, and the meshes. The system may utilize the differentiable rendering engine to gather parameters from the target images. These parameters may be used to tune the upscaled diffuse maps, the upscaled normal maps, the base roughness maps, and the meshes of the generated character model, until that the facial model converges to the target images. The texture maps and meshes can be iteratively modified until they reach the target convergence state.

The final facial model may be associated with realistic diffuse maps, realistic normal maps, realistic roughness maps, and realistic meshes that can be transferred to an animated system to render a realistic animatable character model.

Figure 7:
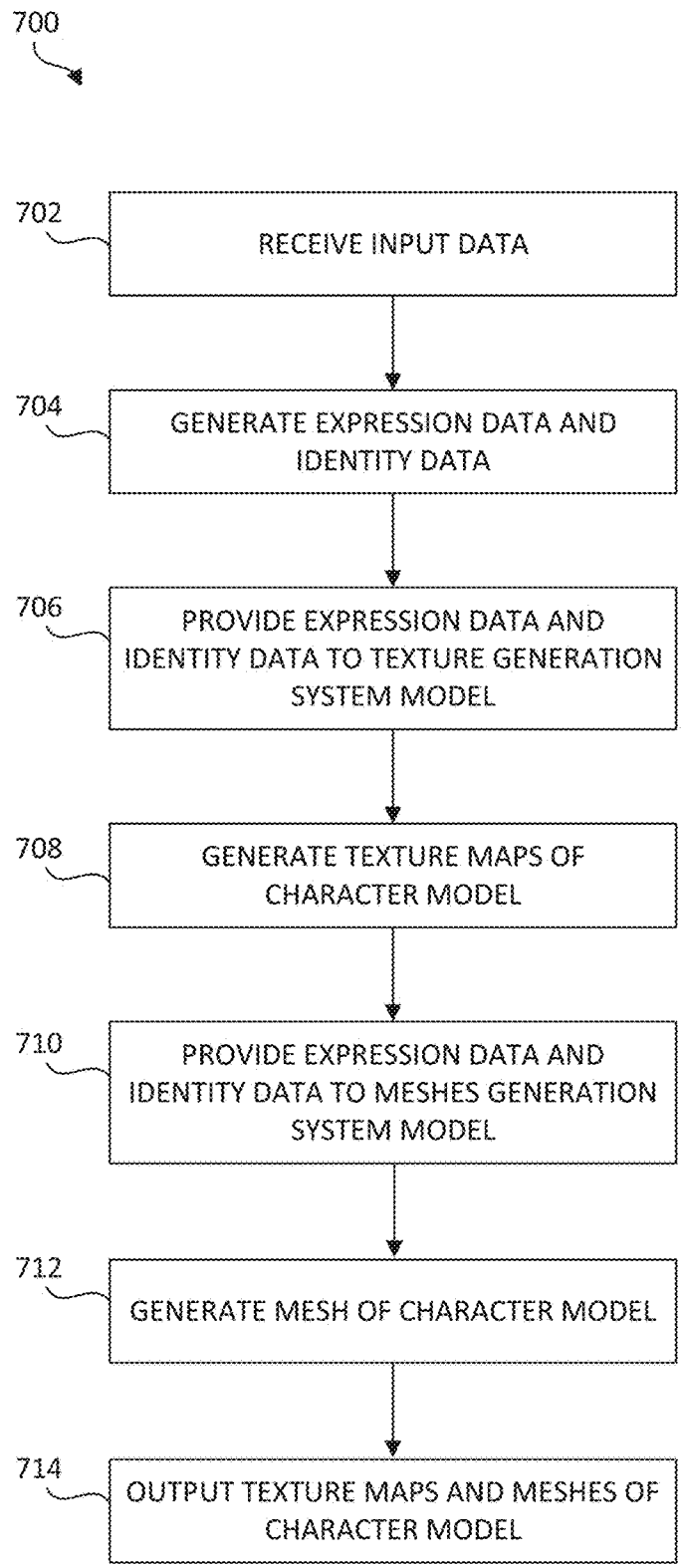
FIG. 7 is a flowchart of an example process for generating neutral and expression information for a character model.

FIG. 7 is a flowchart of an example process 700 for generating neutral and expression information for a character model, such as discussed at block 604 of FIG. 6. For convenience, the process 700 will be described as being performed by a system of one or more computers (e.g., the facial model generation system 100).

At block 702, the system receives input information. The input information may be the input information discussed at block 602 of FIG. 6. At block 704, the system generates expression data and identity data from the input data for a character model. The expression data can be generated using one or more models trained to generate expression information based on input parameters, such as the expression generation system 200 of FIG. 2C. The identity data can be generated using one or more models trained to generate identity information based on input parameters, such as the identity engine 230 of FIG. 2A.

At block 706, the system provides the expression data and identity data to a texture generation system model. The texture generation system model may be one or more models trained to generate texture maps, such as diffuse maps and normal maps, of a character model using expression data and identity data. The texture generation system model may correspond to the texture map generation system 250 of FIG. 2D.

At block 708, the system generates texture maps of the character model. For example, the system may utilize the expression data and identity data provided to the into the texture generation system model to generate diffuse maps and normal maps associated with the character model. In some embodiments, the diffuse maps and normal maps may be low resolution images.

At block 710, the system the expression data and identity data to a mesh generation system model. The mesh generation system model may be one or more models trained to generate the meshes of a character model using expression data and identity data. The mesh generation system model may correspond to the mesh generation system 280 of FIG. 2E.

At block 712, the system generates the meshes of the character model. For example, the system may utilize the expression data and identity data provided to the into the mesh generation system model to generate meshes associated with the character model.

At block 714, the system outputs the texture maps and meshes of the character model. For example, the system may utilize the texture maps and meshes in blocks 606 and 608 of FIG. 6.

Computing System

Figure 8:
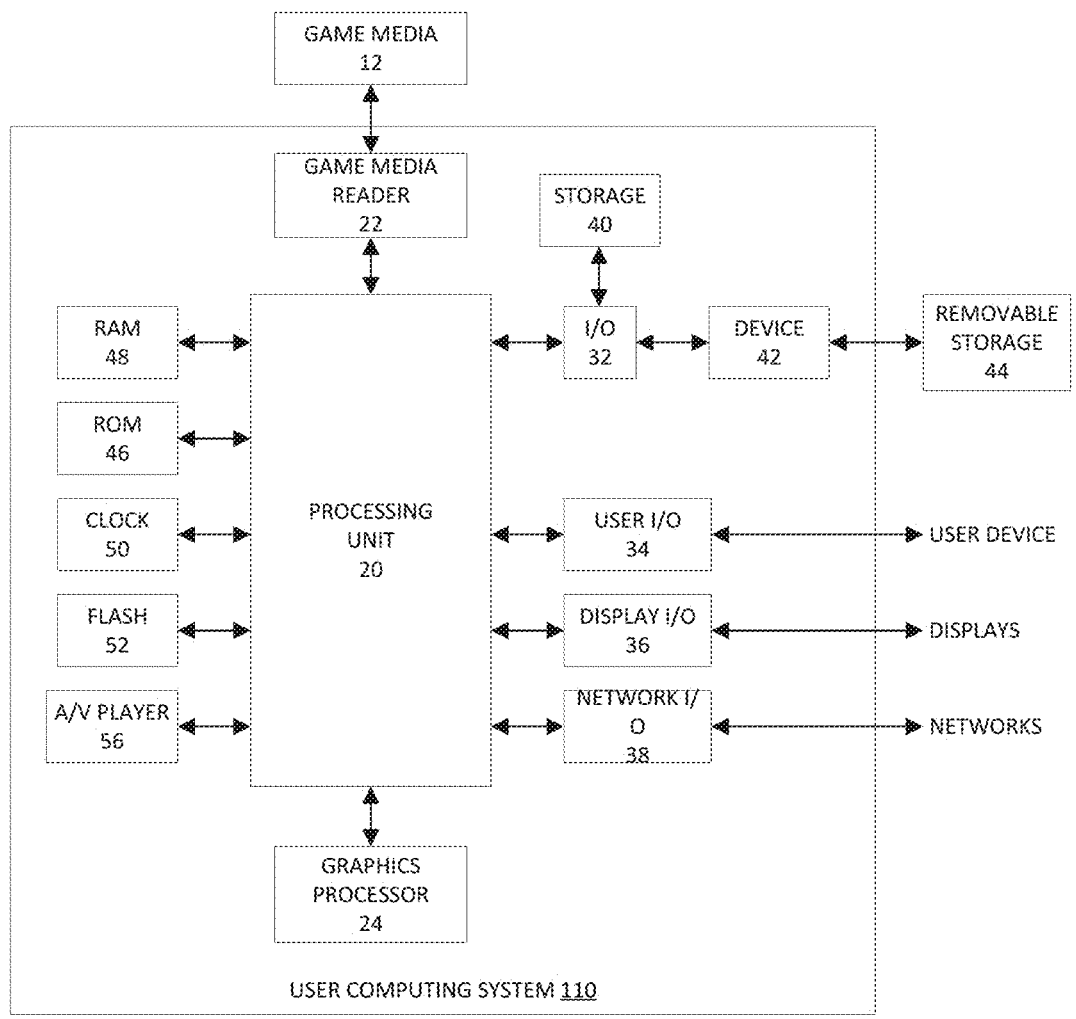
FIG. 8 illustrates an embodiment of computing device according to the present disclosure.

FIG. 8 illustrates an embodiment of computing device 10 according to the present disclosure. Other variations of the computing device 10 may be substituted for the examples explicitly presented herein, such as removing or adding components to the computing device 10. The computing device 10 may include a game device, a smart phone, a tablet, a personal computer, a laptop, a smart television, a car console display, a server, and the like. As shown, the computing device 10 includes a processing unit 20 that interacts with other components of the computing device 10 and also external components to computing device 10. A media reader 22 is included that communicates with media 12. The media reader 22 may be an optical disc reader capable of reading optical discs, such as CD-ROM or DVDs, or any other type of reader that can receive and read data from game media 12. One or more of the computing devices may be used to implement one or more of the systems disclosed herein.

Computing device 10 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the computing device 10 may include a discrete graphics processor 24 that is separate from the processing unit 20. In some such cases, the graphics processor 24 may have separate RAM from the processing unit 20. Computing device 10 might be a handheld video game device, a dedicated game console computing system, a general-purpose laptop or desktop computer, a smart phone, a tablet, a car console, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data, such as game state data and any shared data files. In addition to storage 40 and removable storage media 44, computing device 10 is also shown including range of motion (Read-Only Memory) 46 and RAM 48. RAM 48 may be used for data that is accessed frequently.

User I/O 34 is used to send and receive commands between processing unit 20 and user devices, such as game controllers. In some embodiments, the user I/O can include a touchscreen inputs. The touchscreen can be capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game.

Display output signals produced by display I/O 36 comprising signals for displaying visual content produced by computing device 10 on a display device, such as graphics, user interfaces, video, and/or other visual content. Computing device 10 may comprise one or more integrated displays configured to receive display output signals produced by display I/O 36. According to some embodiments, display output signals produced by display I/O 36 may also be output to one or more display devices external to computing device 10, such a display 16.

The computing device 10 can also include other features that may be used with a game, such as a clock 50, flash memory 52, and other components. An audio/video player 56 might also be used to play a video sequence, such as a movie. It should be understood that other components may be provided in computing device 10 and that a person skilled in the art will appreciate other variations of computing device 10.

Program code can be stored in range of motion 46, RAM 48 or storage 40 (which might comprise hard disk, other magnetic storage, optical storage, other non-volatile storage or a combination or variation of these). Part of the program code can be stored in range of motion that is programmable (ROM, PROM, EPROM, EEPROM, and so forth), part of the program code can be stored in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads media 12 and provides an application, information may be read from game media 12 and stored in a memory device, such as RAM 48. Additionally, data from storage 40, range of motion 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated, via software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence or can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

The following list has example embodiments that are within the scope of this disclosure. The example embodiments that are listed should in no way be interpreted as limiting the scope of the embodiments. Various features of the example embodiments that are listed can be removed, added, or combined to form additional embodiments, which are part of this disclosure:

What is claimed is:
1. A computer-implemented method comprising:
  accessing a first set of machine learning models trained to generate, via a latent variable space, a three-dimensional (3D) mesh and a plurality of two-dimensional (2D) texture maps corresponding to the three-dimensional mesh;

obtaining a first set of input information configured to generate a first facial model having a first identity;

generating, by the first set of machine learning models, the first facial model from the first set of input information, wherein the first facial model includes a plurality of 2D texture maps and a 3D facial mesh of a first face;

accessing a second machine learning model trained to generate photorealistic 2D images based on an input image; and generating, using the second machine learning model, at least one target photorealistic 2D image based on the first facial model;

accessing a differentiable rendering engine, wherein the differentiable rendering engine is configured to modify facial models based on target 2D images;

modifying, by the differentiable rendering engine, the first facial model based on the at least one target photorealistic 2D image; and outputting, by the differentiable rendering engine, an enhanced first facial model, wherein the enhanced first facial model includes a modified version of the plurality of 2D texture maps and a modified version of the 3D facial mesh.

2. The computer-implemented method of claim 1, further comprising, prior to generating the at least one target photorealistic 2D image:

accessing a diffusion-based machine learning model configured to increase resolution of a 2D image;

generating, using the diffusion-based machine learning model, an upscaled 2D texture map for each of the plurality of 2D texture maps, wherein a resolution of each of the plurality of 2D texture maps is increased to a higher resolution.

3. The computer-implemented method of claim 1, wherein modifying the first facial model comprises:

generating a plurality of input images from character facial model based on the plurality of 2D texture maps and 3D facial mesh of the first face from a plurality of different angles;

generating, by the second machine learning model, a plurality of target photorealistic 2D images from the plurality of input images; and extracting, by the differentiable rendering engine, a plurality of 3D surface properties from the plurality of photorealistic images;

adjusting the plurality of 2D texture maps and 3D facial meshes of the first face based on the plurality of 3D surface properties.

4. The computer-implemented method of claim 3, wherein the plurality of 2D texture maps comprise a diffuse texture map and a normal texture map generated by the first set of machine learning models, and a roughness texture map generated by an independent process.

5. The computer-implemented method of claim 3, further comprises iteratively adjusting the 2D texture maps and the 3D facial meshes until a difference threshold is satisfied.

6. The computer-implemented method of claim 5, further comprising:

determining a difference between facial features of at least one 2D render of the adjusted facial model and at least one target photorealistic image; and determining whether the difference satisfies the difference threshold.

7. The computer-implemented method of claim 1, wherein the first facial model is generating having a first expression, and the first set of machine learning models is configured to generate the first facial model for a plurality of expressions.

8. The computer-implemented method of claim 6, wherein the plurality of 2D texture maps comprise at least a diffuse map and a normal map for each expression of the plurality of expressions.

9. The computer-implemented method of claim 1, wherein the first set of machine learning models comprise:

an identity machine learning model trained to generate identity information;

an expression machine learning model trained to generate expression information;

a texture map machine learning model trained to generate 2D texture maps; and a mesh machine learning model trained to generate 3D meshes;

wherein generating the first facial model comprises:

generating, by the identity machine learning model, identity information representative of an invariant identity of the first face;

generating, by the expression machine learning model, expression information from the first set of input information, wherein the expression information includes a defined set of expressions of the first face;

generating, by the texture map machine learning model, the 2D texture maps of the first face in the defined set of expressions from the identity information and the expression information; and generating, by the mesh machine learning model, the 3D facial meshes of the first face in the defined set of expressions from the identity information and the expression information.

10. A system comprising one or more computers and non-transitory computer storage media storing instructions that when executed by the one or more computers, cause the one or more computers to perform operations comprising:

accessing a first set of machine learning models trained to generate, via a latent variable space, a three-dimensional (3D) mesh and a plurality of two-dimensional (2D) texture maps corresponding to the three-dimensional mesh;

obtaining a first set of input information configured to generate a first facial model having a first identity;

generating, by the first set of machine learning models, the first facial model from the first set of input information, wherein the first facial model includes a plurality of 2D texture maps and a 3D facial mesh of a first face;

accessing a second machine learning model trained to generate photorealistic 2D images based on an input image; and generating, using the second machine learning model, at least one target photorealistic 2D image based on the first facial model;

accessing a differentiable rendering engine, wherein the differentiable rendering engine is configured to modify facial models based on target 2D images;

modifying, by the differentiable rendering engine, the first facial model based on the at least one target photorealistic 2D image; and outputting, by the differentiable rendering engine, an enhanced first facial model, wherein the enhanced first facial model includes a modified version of the plurality of 2D texture maps and a modified version of the 3D facial mesh.

11. The system of claim 10, wherein the instructions further configure the one or more computers to perform operations comprising, prior to generating the at least one target photorealistic 2D image:
- accessing a diffusion-based machine learning model configured to increase resolution of a 2D image;
- generating, using the diffusion-based machine learning model, an upscaled 2D texture map for each of the plurality of 2D texture maps, wherein a resolution of each of the plurality of 2D texture maps is increased to a higher resolution.

12. The system of claim 10, wherein the instructions further configure the one or more computers to perform operations when modifying the first facial model comprising:
- generating a plurality of input images from character facial model based on the plurality of 2D texture maps and 3D facial mesh of the first face from a plurality of different angles;
- generating, by the second machine learning model, a plurality of target photorealistic 2D images from the plurality of input images; and
- extracting, by the differentiable rendering engine, a plurality of 3D surface properties from the plurality of photorealistic images;
- adjusting the plurality of 2D texture maps and 3D facial meshes of the first face based on the plurality of 3D surface properties.

13. The system of claim 12, wherein the plurality of 2D texture maps comprise a diffuse texture map and a normal texture map generated by the first set of machine learning models, and a roughness texture map generated by an independent process.

14. The system of claim 12, wherein the instructions further configure the one or more computers to perform operations comprising iteratively adjusting the 2D texture maps and the 3D facial meshes until a difference threshold is satisfied.

15. The system of claim 14, wherein the instructions further configure the one or more computers to perform operations comprising:
- determining a difference between facial features of at least one 2D render of the adjusted facial model and at least one target photorealistic image; and
- determining whether the difference satisfies the difference threshold.

16. The system of claim 10, wherein the first facial model is generating having a first expression, and the first set of machine learning models is configured to generate the first facial model for a plurality of expressions.

17. The system of claim 16, wherein the plurality of 2D texture maps comprise at least a diffuse map and a normal map for each expression of the plurality of expressions.

18. The system of claim 10, wherein the first set of machine learning models comprise:
- an identity machine learning model trained to generate identity information;
- an expression machine learning model trained to generate expression information;
- a texture map machine learning model trained to generate 2D texture maps; and
- a mesh machine learning model trained to generate 3D meshes;

wherein generating the first facial model comprises:
- generating, by the identity machine learning model, identity information representative of an invariant identity of the first face;
- generating, by the expression machine learning model, expression information from first set of input information, wherein the expression information includes a defined set of expressions of the first face;
- generating, by the texture map machine learning model, the 2D texture maps of the first face in the defined set of expressions from the identity information and the expression information; and
- generating, by the mesh machine learning model, the 3D facial meshes of the first face in the defined set of expressions from the identity information and the expression information.

19. Non-transitory computer-readable medium storing computer-executable instructions that when executed by a system of one or more computers, cause the one or more computers to perform operations comprising:
- accessing a first set of machine learning models trained to generate, via a latent variable space, a three-dimensional (3D) mesh and a plurality of two-dimensional (2D) texture maps corresponding to the three-dimensional mesh;
- obtaining a first set of input information configured to generate a first facial model having a first identity;
- generating, by the first set of machine learning models, the first facial model from the first set of input information, wherein the first facial model includes a plurality of 2D texture maps and a 3D facial mesh of a first face;
- accessing a second machine learning model trained to generate photorealistic 2D images based on an input image; and
- generating, using the second machine learning model, at least one target photorealistic 2D image based on the first facial model;
- accessing a differentiable rendering engine, wherein the differentiable rendering engine is configured to modify facial models based on target 2D images;
- modifying, by the differentiable rendering engine, the first facial model based on the at least one target photorealistic 2D image; and
- outputting, by the differentiable rendering engine, an enhanced first facial model, wherein the enhanced first facial model includes a modified version of the plurality of 2D texture maps and a modified version of the 3D facial mesh.

20. The non-transitory computer-readable medium of claim 19, wherein, prior to generating the at least one target photorealistic 2D image, the instructions further configure the one or more computers to perform operations comprising:
- accessing a diffusion-based machine learning model configured to increase resolution of a 2D image;
- generating, using the diffusion-based machine learning model, an upscaled 2D texture map for each of the plurality of 2D texture maps, wherein a resolution of each of the plurality of 2D texture maps is increased to a higher resolution.

* * * * *